United States Patent
Bowers et al.

(10) Patent No.: US 9,495,465 B2
(45) Date of Patent: Nov. 15, 2016

(54) SYSTEM AND METHOD FOR PROVIDING THE IDENTIFICATION OF GEOGRAPHICALLY CLOSEST ARTICLE DISPENSING MACHINES

(75) Inventors: Brad Bowers, Winfield, IL (US);
Imran Maskatia, Milpitas, CA (US);
Jason Rubinstein, Lake Forest, IL (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 0 days.

(21) Appl. No.: 13/551,510

(22) Filed: Jul. 17, 2012

(65) Prior Publication Data

US 2013/0046753 A1  Feb. 21, 2013

Related U.S. Application Data

(60) Provisional application No. 61/510,015, filed on Jul. 20, 2011.

(51) Int. Cl.
  *G06F 17/30* (2006.01)
  *G07F 9/02* (2006.01)
  *G06Q 30/02* (2012.01)
(52) U.S. Cl.
  CPC ....... *G06F 17/3087* (2013.01); *G06Q 30/0259* (2013.01); *G07F 9/02* (2013.01)
(58) Field of Classification Search
  None
  See application file for complete search history.

(56) References Cited

U.S. PATENT DOCUMENTS 2,098,697 A   11/1937   Vanderput
3,267,436 A    8/1966   Alpert et al.
(Continued)

FOREIGN PATENT DOCUMENTS

JP    2001312507 A    11/2001
JP    2002108868 A     4/2002

OTHER PUBLICATIONS

Sherman, RIAA Response to Senator Coleman's File-Sharing Inquiry Jul. 31, 2003, http://www.thesongnet.org/ffm/filesharing-vs-piracy/riaa-response-senator-coleman.html.*

(Continued)

*Primary Examiner* — Jason Liao
(74) *Attorney, Agent, or Firm* — James P. Muraff; Neal, Gerber & Eisenberg LLP

(57) ABSTRACT

A system and method of searching for physical media articles available from article dispensing machines within a geographic proximity is provided. Searching may include matching keywords in search criteria or using predefined search criteria for browsing of static or dynamic listings of media content. The method includes receiving a search request including search criteria, and searching the metadata database for a physical media article matching the search criteria. The method also includes determining the availability of the matching media article at an article dispensing machine. The geographic location of article dispensing machines with available matching media articles is determined, based on personally identifying information such as an IP or MAC address. The geographic location may be limited by a proximity from an audio/visual display interface. A search result set with the matching media articles is provided, based on their availabilities.

27 Claims, 13 Drawing Sheets

(56) References Cited

U.S. PATENT DOCUMENTS

| | | |
|---|---|---|
| 3,379,295 A | 4/1968 | Varley |
| 3,529,155 A | 9/1970 | Hansen |
| 3,622,995 A | 11/1971 | Dilks et al. |
| 3,648,241 A | 3/1972 | Naito et al. |
| 3,824,544 A | 7/1974 | Simjian |
| 3,826,344 A | 7/1974 | Wahlberg |
| 3,831,807 A | 8/1974 | Deaton et al. |
| 3,946,220 A | 3/1976 | Brobeck et al. |
| 3,964,577 A | 6/1976 | Bengtsson |
| 4,043,483 A | 8/1977 | Gore et al. |
| 4,073,368 A | 2/1978 | Mustapick |
| 4,300,040 A | 11/1981 | Gould et al. |
| 4,306,219 A | 12/1981 | Main et al. |
| 4,348,551 A | 9/1982 | Nakatani et al. |
| 4,369,422 A | 1/1983 | Rasmussen et al. |
| 4,369,442 A | 1/1983 | Werth et al. |
| 4,385,366 A | 5/1983 | Housey, Jr. |
| 4,388,689 A | 6/1983 | Hayman et al. |
| 4,396,985 A | 8/1983 | Ohara et al. |
| 4,414,467 A | 11/1983 | Gould et al. |
| 4,415,065 A | 11/1983 | Sandstedt et al. |
| 4,449,186 A | 5/1984 | Kelly et al. |
| 4,458,802 A | 7/1984 | Maciver et al. |
| 4,519,522 A | 5/1985 | McElwee |
| 4,530,067 A | 7/1985 | Dorr et al. |
| 4,547,851 A | 10/1985 | Kurland et al. |
| 4,553,222 A | 11/1985 | Kurland et al. |
| 4,567,359 A | 1/1986 | Lockwood et al. |
| 4,569,421 A | 2/1986 | Sandstedt |
| RE32,115 E | 4/1986 | Lockwood et al. |
| 4,598,810 A | 7/1986 | Shore et al. |
| 4,649,481 A | 3/1987 | Takahashi et al. |
| 4,650,977 A | 3/1987 | Couch et al. |
| 4,668,150 A | 5/1987 | Blumberg |
| 4,669,596 A | 6/1987 | Capers et al. |
| 4,675,515 A | 6/1987 | Lucero et al. |
| 4,706,794 A | 11/1987 | Awane et al. |
| 4,722,053 A | 1/1988 | Dubno et al. |
| 4,723,212 A | 2/1988 | Mindrum et al. |
| 4,734,005 A | 3/1988 | Blumberg |
| 4,766,548 A | 8/1988 | Cedrone et al. |
| 4,767,917 A | 8/1988 | Ushikubo et al. |
| 4,775,935 A | 10/1988 | Yourick |
| 4,778,983 A | 10/1988 | Ushikubo et al. |
| 4,789,045 A | 12/1988 | Pugh et al. |
| 4,789,054 A | 12/1988 | Shore et al. |
| 4,797,818 A | 1/1989 | Cotter |
| 4,812,629 A | 3/1989 | O'Neil et al. |
| 4,812,985 A | 3/1989 | Hambrick et al. |
| 4,814,592 A | 3/1989 | Bradt et al. |
| 4,814,985 A | 3/1989 | Swistak et al. |
| 4,821,917 A | 4/1989 | Brown |
| 4,825,045 A | 4/1989 | Humble et al. |
| 4,839,505 A | 6/1989 | Bradt et al. |
| 4,839,507 A | 6/1989 | May |
| 4,847,764 A | 7/1989 | Halvorson |
| 4,858,743 A | 8/1989 | Paraskevakos et al. |
| 4,860,876 A | 8/1989 | Moore et al. |
| 4,866,661 A | 9/1989 | De Prins et al. |
| 4,882,475 A | 11/1989 | Miller et al. |
| 4,893,705 A | 1/1990 | Brown |
| 4,893,727 A | 1/1990 | Near |
| 4,896,024 A | 1/1990 | Morello et al. |
| 4,903,815 A | 2/1990 | Hirschfeld et al. |
| 4,915,205 A | 4/1990 | Reid et al. |
| D308,052 S | 5/1990 | Darden et al. |
| 4,941,841 A | 7/1990 | Darden et al. |
| 4,945,428 A | 7/1990 | Waldo et al. |
| 4,947,028 A | 8/1990 | Gorog |
| 4,959,686 A | 9/1990 | Spallone et al. |
| 4,967,403 A | 10/1990 | Ogawa et al. |
| 4,967,906 A | 11/1990 | Morello et al. |
| 4,982,346 A | 1/1991 | Girouard et al. |
| 4,991,739 A | 2/1991 | Levasseur |
| 4,995,498 A | 2/1991 | Menke |
| 5,007,518 A | 4/1991 | Crooks et al. |
| 5,012,077 A | 4/1991 | Takano et al. |
| 5,013,897 A | 5/1991 | Harman et al. |
| 5,019,699 A | 5/1991 | Koenck et al. |
| 5,020,958 A | 6/1991 | Tuttobene et al. |
| 5,028,766 A | 7/1991 | Shah et al. |
| 5,042,686 A | 8/1991 | Stucki |
| 5,077,462 A | 12/1991 | Newell et al. |
| 5,077,607 A | 12/1991 | Johnson et al. |
| 5,085,308 A | 2/1992 | Wilhelm |
| 5,088,586 A | 2/1992 | Isobe et al. |
| 5,091,713 A | 2/1992 | Horne et al. |
| 5,095,195 A | 3/1992 | Harman et al. |
| 5,105,069 A | 4/1992 | Hakenewerth et al. |
| 5,128,862 A | 7/1992 | Mueller et al. |
| 5,133,441 A | 7/1992 | Brown |
| 5,139,384 A | 8/1992 | Tuttobene et al. |
| 5,143,193 A | 9/1992 | Geraci |
| 5,159,560 A | 10/1992 | Newell et al. |
| 5,205,436 A | 4/1993 | Savage |
| 5,206,814 A | 4/1993 | Cahlander et al. |
| 5,207,784 A | 5/1993 | Schwartzendruber et al. |
| 5,212,649 A | 5/1993 | Pelletier |
| 5,235,509 A | 8/1993 | Mueller et al. |
| RE34,369 E | 9/1993 | Darden et al. |
| 5,273,183 A | 12/1993 | Tuttobene et al. |
| 5,313,392 A | 5/1994 | Temma et al. |
| 5,313,393 A | 5/1994 | Varley et al. |
| 5,319,705 A | 6/1994 | Halter |
| 5,323,327 A | 6/1994 | Carmichael et al. |
| 5,353,219 A | 10/1994 | Mueller et al. |
| 5,383,111 A | 1/1995 | Homma et al. |
| 5,385,265 A | 1/1995 | Schlamp et al. |
| 5,408,417 A | 4/1995 | Wilder |
| 5,409,092 A | 4/1995 | Itako et al. |
| 5,418,713 A | 5/1995 | Allen et al. |
| 5,442,568 A | 8/1995 | Ostendorf et al. |
| 5,445,295 A | 8/1995 | Brown et al. |
| 5,450,584 A | 9/1995 | Sekiguchi et al. |
| 5,450,938 A | 9/1995 | Rademacher et al. |
| 5,467,892 A | 11/1995 | Schlamp et al. |
| 5,482,139 A | 1/1996 | Rivalto et al. |
| 5,484,988 A | 1/1996 | Hills et al. |
| 5,499,707 A | 3/1996 | Steury |
| 5,504,675 A | 4/1996 | Cragun et al. |
| 5,510,979 A | 4/1996 | Moderi et al. |
| 5,513,116 A | 4/1996 | Buckley et al. |
| 5,546,316 A | 8/1996 | Buckley et al. |
| 5,550,746 A | 8/1996 | Jacobs |
| 5,555,143 A | 9/1996 | Hinnen et al. |
| 5,559,714 A | 9/1996 | Banks et al. |
| 5,561,604 A | 10/1996 | Buckley et al. |
| 5,576,951 A | 11/1996 | Lockwood |
| 5,594,791 A | 1/1997 | Szlam et al. |
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls et al. |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan et al. |
| 5,715,403 A | 2/1998 | Stefik et al. |
| 5,724,069 A | 3/1998 | Chen et al. |
| 5,724,521 A | 3/1998 | Dedrick et al. |
| 5,732,398 A | 3/1998 | Tagawa et al. |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs et al. |
| 5,769,269 A | 6/1998 | Peters et al. |
| 5,777,884 A | 7/1998 | Belka et al. |
| 5,790,677 A | 8/1998 | Fox et al. |
| 5,806,071 A | 9/1998 | Balderrama et al. |

(56) References Cited

U.S. PATENT DOCUMENTS

| | | |
|---|---|---|
| 5,822,216 A | 10/1998 | Satchell et al. |
| 5,822,291 A | 10/1998 | Brindze et al. |
| 5,831,862 A | 11/1998 | Hetrick et al. |
| 5,832,503 A | 11/1998 | Malik et al. |
| 5,850,442 A | 12/1998 | Muftic et al. |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell et al. |
| 5,898,594 A | 4/1999 | Leason et al. |
| 5,900,608 A | 5/1999 | Iida et al. |
| 5,905,246 A | 5/1999 | Fajkowski |
| 5,923,016 A | 7/1999 | Fredregill et al. |
| 5,930,771 A | 7/1999 | Stapp et al. |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,943,423 A | 8/1999 | Muftic et al. |
| 5,950,173 A | 9/1999 | Perkowski et al. |
| 5,954,797 A | 9/1999 | Sidey et al. |
| 5,956,694 A | 9/1999 | Powell et al. |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott et al. |
| 5,988,346 A | 11/1999 | Tedesco et al. |
| 5,988,431 A | 11/1999 | Roe |
| 5,997,170 A | 12/1999 | Brodbeck et al. |
| 6,002,395 A | 12/1999 | Wagner et al. |
| 6,014,137 A | 1/2000 | Burns et al. |
| 6,029,851 A | 2/2000 | Jenkins et al. |
| 6,039,244 A | 3/2000 | Finsterwald |
| 6,044,362 A | 3/2000 | Neely et al. |
| 6,047,338 A | 4/2000 | Grolemund et al. |
| 6,050,448 A | 4/2000 | Willis |
| 6,056,194 A | 5/2000 | Kolls et al. |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata et al. |
| 6,119,934 A | 9/2000 | Kolls et al. |
| 6,123,223 A | 9/2000 | Watkins |
| 6,125,353 A | 9/2000 | Yagasaki |
| 6,126,036 A | 10/2000 | d'Alayer de Costemore d' Arc et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg, Jr. et al. |
| 6,466,830 B1 | 10/2002 | Manross |
| 6,477,503 B1 | 11/2002 | Mankes |
| 6,490,502 B2 | 12/2002 | Fellows et al. |
| 6,493,110 B1 | 12/2002 | Roberts |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B1 | 8/2005 | Fajkowski |
| 6,954,732 B1 | 10/2005 | DeLapa et al. |
| 6,959,285 B2 | 10/2005 | Stefanik et al. |
| 6,959,286 B2 | 10/2005 | Perkowski |
| 6,965,869 B1 | 11/2005 | Tomita et al. |
| 6,968,365 B2 | 11/2005 | Hollström et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |

(56) References Cited

U.S. PATENT DOCUMENTS

| | | | |
|---|---|---|---|
| 7,024,390 B1 | 4/2006 | Mori et al. |
| 7,043,497 B1 | 5/2006 | Carty et al. |
| 7,053,773 B2 | 5/2006 | McGarry et al. |
| 7,058,581 B1 | 6/2006 | Young |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,084,737 B1 | 8/2006 | Moore et al. |
| 7,085,556 B2 | 8/2006 | Offer |
| 7,085,727 B2 | 8/2006 | VanOrman |
| 7,108,180 B2 | 9/2006 | Brusso et al. |
| 7,139,731 B1 | 11/2006 | Alvin |
| 7,167,842 B1 | 1/2007 | Josephson, II et al. |
| 7,167,892 B2 | 1/2007 | Defossé et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,233,916 B2 | 6/2007 | Schultz |
| 7,234,609 B2 | 6/2007 | DeLazzer et al. |
| 7,236,946 B2 | 6/2007 | Bates et al. |
| 7,240,805 B2 | 7/2007 | Chirnomas |
| 7,240,843 B2 | 7/2007 | Paul et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,584,869 B2 | 9/2009 | DeLazzer et al. |
| 7,747,346 B2 | 6/2010 | Lowe et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,853,354 B2 | 12/2010 | Kuehnrich et al. |
| 7,853,600 B2 | 12/2010 | Herz et al. |
| 7,860,606 B2 | 12/2010 | Rudy |
| 7,988,049 B2 | 8/2011 | Kuehnrich |
| 8,015,172 B1 * | 9/2011 | Cave et al. | 707/706 |
| 8,060,249 B2 | 11/2011 | Bear et al. |
| 8,235,247 B2 | 8/2012 | Alvarez |
| 8,352,449 B1 | 1/2013 | Parekh et al. |
| 8,365,257 B1 * | 1/2013 | Causey et al. | 726/5 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0002513 A1 * | 1/2002 | Chiasson | 705/27 |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 | 9/2002 | Jenkins et al. |
| 2002/0133269 A1 | 9/2002 | Anselmi |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |
| 2003/0004828 A1 | 1/2003 | Epstein |
| 2003/0009408 A1 | 1/2003 | Korin |
| 2003/0023453 A1 | 1/2003 | Hafen et al. |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149510 A1 | 8/2003 | Takahashi |
| 2003/0163382 A1 | 8/2003 | Stefanik et al. |
| 2003/0163399 A1 | 8/2003 | Harper et al. |
| 2003/0167231 A1 | 9/2003 | Winking et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 | 4/2004 | Messenger et al. |
| 2004/0133466 A1 | 7/2004 | Redmond et al. |
| 2004/0133653 A1 | 7/2004 | Defosse et al. |
| 2004/0153413 A1 | 8/2004 | Gross |
| 2004/0158503 A1 | 8/2004 | Gross |
| 2004/0158504 A1 | 8/2004 | Gross |
| 2004/0158871 A1 | 8/2004 | Jacobson |
| 2004/0162633 A1 | 8/2004 | Kraft |
| 2004/0162783 A1 | 8/2004 | Gross |
| 2004/0172274 A1 | 9/2004 | Gross |
| 2004/0172275 A1 | 9/2004 | Gross |
| 2004/0172342 A1 | 9/2004 | Gross |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1 | 2/2005 | Knowles et al. |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0197855 A1 | 9/2005 | Nudd |
| 2005/0216120 A1 | 9/2005 | Rosenberg |
| 2005/0230410 A1 | 10/2005 | DeLazzer et al. |
| 2005/0230473 A1 | 10/2005 | Fajkowski |
| 2005/0234911 A1 | 10/2005 | Hess et al. |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0122881 A1 | 6/2006 | Walker et al. |
| 2006/0149685 A1 | 7/2006 | Gross |
| 2006/0155575 A1 | 7/2006 | Gross |
| 2006/0184395 A1 | 8/2006 | Millwee |
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |

(56) References Cited

U.S. PATENT DOCUMENTS

| | | | |
|---|---|---|---|
| 2006/0231613 A1 | 10/2006 | Walker et al. | |
| 2006/0231614 A1 | 10/2006 | Walker et al. | |
| 2006/0235746 A1 | 10/2006 | Hammond et al. | |
| 2006/0235747 A1 | 10/2006 | Hammond et al. | |
| 2006/0241966 A1 | 10/2006 | Walker et al. | |
| 2006/0241967 A1 | 10/2006 | Gross | |
| 2006/0242059 A1 | 10/2006 | Hansen | |
| 2006/0247823 A1 | 11/2006 | Boucher | |
| 2006/0247824 A1 | 11/2006 | Walker et al. | |
| 2006/0254832 A1 | 11/2006 | Strong | |
| 2006/0254862 A1 | 11/2006 | Hoersten | |
| 2006/0259190 A1 | 11/2006 | Hale | |
| 2006/0259191 A1 | 11/2006 | Lowe | |
| 2006/0259192 A1 | 11/2006 | Lowe et al. | |
| 2006/0265101 A1 | 11/2006 | Kaplan et al. | |
| 2006/0265286 A1 | 11/2006 | Evangelist et al. | |
| 2006/0266823 A1 | 11/2006 | Passen et al. | |
| 2006/0271281 A1* | 11/2006 | Ahn | G09B 29/106 701/532 |
| 2006/0272922 A1 | 12/2006 | Hoersten et al. | |
| 2006/0273152 A1 | 12/2006 | Fields | |
| 2007/0005438 A1 | 1/2007 | Evangelist et al. | |
| 2007/0011093 A1 | 1/2007 | Tree | |
| 2007/0011903 A1 | 1/2007 | Chang | |
| 2007/0050083 A1 | 3/2007 | Signorelli et al. | |
| 2007/0050256 A1 | 3/2007 | Walker et al. | |
| 2007/0050266 A1 | 3/2007 | Barber et al. | |
| 2007/0051802 A1 | 3/2007 | Barber et al. | |
| 2007/0063020 A1 | 3/2007 | Barrafato | |
| 2007/0063027 A1 | 3/2007 | Belfer et al. | |
| 2007/0067429 A1 | 3/2007 | Jain et al. | |
| 2007/0084872 A1 | 4/2007 | Hair et al. | |
| 2007/0084917 A1 | 4/2007 | Fajkowski | |
| 2007/0094245 A1 | 4/2007 | Vigil | |
| 2007/0095901 A1 | 5/2007 | Illingworth | |
| 2007/0125104 A1 | 6/2007 | Ehlers | |
| 2007/0130020 A1 | 6/2007 | Paolini | |
| 2007/0136247 A1 | 6/2007 | Vigil | |
| 2007/0156442 A1 | 7/2007 | Ali | |
| 2007/0156578 A1 | 7/2007 | Perazolo | |
| 2007/0162183 A1 | 7/2007 | Pinney et al. | |
| 2007/0162184 A1 | 7/2007 | Pinney et al. | |
| 2007/0169132 A1 | 7/2007 | Blust et al. | |
| 2007/0175986 A1 | 8/2007 | Petrone et al. | |
| 2007/0179668 A1 | 8/2007 | Mellin | |
| 2007/0185776 A1 | 8/2007 | Nguyen et al. | |
| 2007/0210153 A1 | 9/2007 | Walker et al. | |
| 2007/0213871 A1 | 9/2007 | Whitten et al. | |
| 2007/0276537 A1 | 11/2007 | Walker et al. | |
| 2008/0005025 A1 | 1/2008 | Legere et al. | |
| 2008/0027835 A1 | 1/2008 | LeMasters et al. | |
| 2008/0040211 A1 | 2/2008 | Walker et al. | |
| 2008/0125906 A1 | 5/2008 | Bates et al. | |
| 2008/0222690 A1 | 9/2008 | Kim | |
| 2008/0239961 A1 | 10/2008 | Hilerio et al. | |
| 2008/0275591 A1 | 11/2008 | Chirnomas | |
| 2009/0018792 A1 | 1/2009 | Kuehnrich | |
| 2009/0030931 A1 | 1/2009 | Khivesara et al. | |
| 2009/0048932 A1 | 2/2009 | Barber | |
| 2009/0089187 A1 | 4/2009 | Hoersten et al. | |
| 2009/0113116 A1 | 4/2009 | Thompson et al. | |
| 2009/0299824 A1 | 12/2009 | Barnes, Jr. | |
| 2010/0010964 A1 | 1/2010 | Skowronek et al. | |
| 2010/0036808 A1 | 2/2010 | Lee | |
| 2010/0042577 A1 | 2/2010 | Rinearson | |
| 2010/0057871 A1* | 3/2010 | Kaplan et al. | 709/206 |
| 2010/0153983 A1 | 6/2010 | Philmon et al. | |
| 2010/0198400 A1 | 8/2010 | Pascal et al. | |
| 2010/0274624 A1 | 10/2010 | Rochford et al. | |
| 2010/0312380 A1 | 12/2010 | Lowe et al. | |
| 2010/0314405 A1 | 12/2010 | Alvarez | |
| 2010/0318219 A1 | 12/2010 | Kuehnrich et al. | |
| 2011/0004536 A1 | 1/2011 | Hoersten et al. | |
| 2011/0047010 A1 | 2/2011 | Arnold et al. | |
| 2011/0060454 A1 | 3/2011 | Lowe et al. | |
| 2011/0060456 A1 | 3/2011 | Lowe et al. | |
| 2011/0093329 A1 | 4/2011 | Bodor et al. | |
| 2011/0103609 A1 | 5/2011 | Pelland et al. | |
| 2011/0130873 A1 | 6/2011 | Yepez et al. | |
| 2011/0131652 A1 | 6/2011 | Robinson et al. | |
| 2011/0145033 A1 | 6/2011 | Kuehnrich et al. | |
| 2011/0153060 A1 | 6/2011 | Yepez et al. | |
| 2011/0153067 A1 | 6/2011 | Weinshenker | |
| 2011/0153071 A1 | 6/2011 | Claessen | |
| 2011/0238194 A1 | 9/2011 | Rosenberg | |
| 2011/0238296 A1* | 9/2011 | Purks et al. | 701/201 |
| 2012/0311633 A1 | 12/2012 | Mandrekar et al. | |
| 2013/0046707 A1 | 2/2013 | Maskatia et al. | |
| 2013/0060648 A1 | 3/2013 | Maskatia et al. | |

OTHER PUBLICATIONS mwchambers, How ro Reserve Redbox Movies Online Feb. 13, 2009, http://web.archive.org/web/20090213200036/http://www.ehow.com/how__4770939__reserve-redbox-movies-online.html.*

Brennan, Redbox Launches Blu-Ray Rentals Jul. 29, 2010, http://www.redbox.com/release__20100729.*

Axon, Kiosks Now Testing Video Game Rentals Across US Oct. 12, 2010, http://mashable.com/2010/10/12/redbox-video-games/.*

Redbox [Accessed Jan. 11, 2014; Captured Apr. 20, 2009], https://web.archive.org/web/20090420151822/http://www.redbox.com/Locations/KioskSearch.aspx.*

MaxMind—Resources for Developers as of Jun. 27, 2009 [Captured on Aug. 15, 2014], archive.org, https://web.archive.org/web/20090626232544/http://www.maxmind.com/app/api.*

Seigel et al, How does IP geolocating work? May 1, 2010, stackoverflow.com, http://stackoverflow.com/questions/1996106/how-does-ip-geolocating-work.*

Sheth et al., Federated Database Systems for Managing Distributed, Heterogeneous, and Autonomous Databases Sep. 1990, ACM, ACM Computing Surveys vol. 22 No. 3, 184-236.* samy kamkar, samy's geolocation proof of concept Jan. 4, 2010, samy.pl, http://www.samy.pl/mapxss/.*

ADMIN, Find anyone's location from their router MAC address (Google Maps API exploit) Oct. 4, 2010, Tech Tips, http://techattitude.com/internet/find-anyones-location-from-their-router-mac-address-google-maps-api-exploit/.*

Canadian Office Action for Canadian Patent Application No. 2604730, mailed on Aug. 27, 2015.

European Search Report for Application No. EP1280399, mailed on Aug. 19, 2015, 8 pages.

International Search Report and Written Opinion for Application No. PCT/US2012/047086, mailed on Dec. 21, 2012, 12 pages.

Supplemental European Search Report for Application No. EP12814855 mailed on Oct. 21, 2014, 1 page.

* cited by examiner

Legend

| | |
|---|---|
| 232 | Housing |
| 234 | User Interface |
| 240 | Card Reader |
| 242 | Touch Screen |
| 244 | Article Transfer Opening |

SYSTEM AND METHOD FOR PROVIDING THE IDENTIFICATION OF GEOGRAPHICALLY CLOSEST ARTICLE DISPENSING MACHINES

CROSS-REFERENCE TO RELATED APPLICATION

This application claims priority to U.S. Provisional Application No. 61/510,015, filed Jul. 20, 2011, entitled "SYSTEM AND METHOD FOR PROVIDING THE IDENTIFICATION OF GEOGRAPHICALLY CLOSEST ARTICLE DISPENSING MACHINES", and is incorporated herein by reference in its entirety.

TECHNICAL FIELD

This invention relates to a system and method for providing the identification of geographically closest article dispensing machines in searching for media content. More particularly, the present invention provides a system and method for searching for physical media articles that are available at an article dispensing machine that is geographically closest to the location where the search originated.

BACKGROUND AND SUMMARY OF THE INVENTION

While the present invention is often described herein with reference to a digital video disc, Blu-Ray disc and video game distribution system, an application to which the present invention is advantageously suited, it will be readily apparent that the present invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray and video game rental activities.

One improved article dispensing machine is disclosed in commonly owned U.S. Pat. No. 7,234,609, which is herein incorporated by reference in its entirety. The invention of the U.S. Pat. No. 7,234,609 and the present invention can function as an article dispensing machine-based distribution system that will typically have multiple units of each new release per article dispensing machine. The dispensing machines of the U.S. Pat. No. 7,234,609 and the present invention can stock up to two thousand DVDs, Blu-Ray, video games or other discs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the present invention yields a competitive advantage in the DVD, Blu-Ray and video games rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, dispensing machines can be situated in retail locations having high foot traffic, such as at a popular grocery store, restaurant, drug store, and/or other popular retail location.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from retail locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the retail locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD, Blu-Ray and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application, and an article transport storage unit that facilitates the exchange of new discs for old discs in each machine with virtually no need for human intervention. These technologies and others fill long-felt needs in the art and give advantages over conventional video distribution options. The dispensing machine of the U.S. Pat. No. 7,234,609 and the present invention functions as much as a promotional platform as it does a rental kiosk.

By utilizing the dispensing machines and the fully-interactive, real-time, linked Internet website or mobile/consumer electronics device applications, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network or other Internet connection at each retail location. Through this linked network, the rental experience for each consumer can be customized based on a profile for each consumer, such as via personalized home pages and rental screens.

Existing media content search engines provide search results that include only digital media available at digital media content providers. Other existing media content search engines provide search results that only include physical media articles, such as DVDs, Blu-Ray discs, and video games. A user of existing media content search engines cannot view search results that include an aggregation of digital media and physical media articles. Some users may wish to rent or obtain a physical media article rather than access a digital media selection for cost, video quality, convenience, or other reasons, but these users must access a specific search engine to obtain results related to the physical media articles. In addition, the search results from existing media content search engines may include results that are based directly on the search criteria, while some users may be interested in additional media content that is indirectly associated with the search criteria. Furthermore, the search results from existing media content search engines may include media selections that are only available to customers with certain subscription packages. In this case, a user may become frustrated when they attempt to view a particular media selection only to find that their subscription package does not allow access.

The present invention permits a user to search for media content including physical media articles and digital media. Physical media articles may include, for example, DVDs, Blu-Ray discs, and video game discs, while digital media may include, for example, streaming videos, videos-on-demand, downloadable videos, streaming video games, and downloadable video games. Searching for media content may include matching keywords in search criteria or using predefined search criteria for browsing of static or dynamic listings of media content. By returning search results that aggregate both physical and digital media content, the present invention allows users to have convenient access to all of their media content options. Moreover, content providers for the digital media selections and providers of the physical media articles receive exposure to potential customers by allowing users to see the breadth and availability of multiple types of media content in a single search result set. The present invention overcomes disadvantages of existing media content search engines by showing search results that include media articles and media selections corresponding to search criteria received in a search request. The availability of the media articles and media selections is also provided, such as information related to inventory and subscription access. A metadata database is searched for the metadata of a media article matching search criteria and the metadata of a media selection matching the search criteria, in response to receiving a search request with the search criteria. An availability of the matching media article at an article dispensing machine is determined, an associated content provider is identified, and an availability of the matching media selection at the associated content provider is determined. A search result set based on the determined availabilities of the matching media article and the matching media selection is provided. A customer subscription for the associated content provider is accessed so that the matching media selection is returned in the search result set if the customer subscription allows access to the matching media selection.

The present invention further allows a user to determine the location and distance of article dispensing machines respective to the current location of the user. The present invention may allow this determination without requiring the user to input his or her current location. In one embodiment, the present invention determines the location of, and distance to, local article dispensing machines based on personally identifiable information. The personally identifiable information may be the Internet Protocol ("IP") address or Media Access Control ("MAC") address of an electronic device that the user is operating. The personally identifiable information may also or alternatively be already stored in a database and associated with the user's account information. Other features and advantages are provided by the following description and drawings.

DETAILED DESCRIPTION OF THE INVENTION

Figure 1:
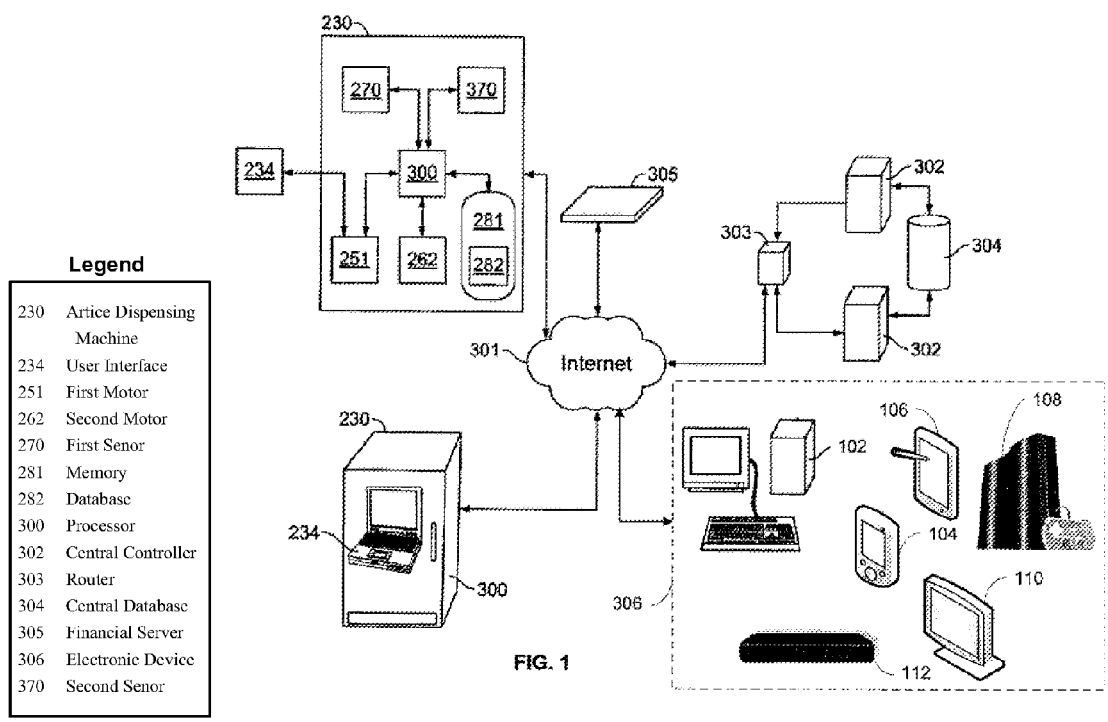
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
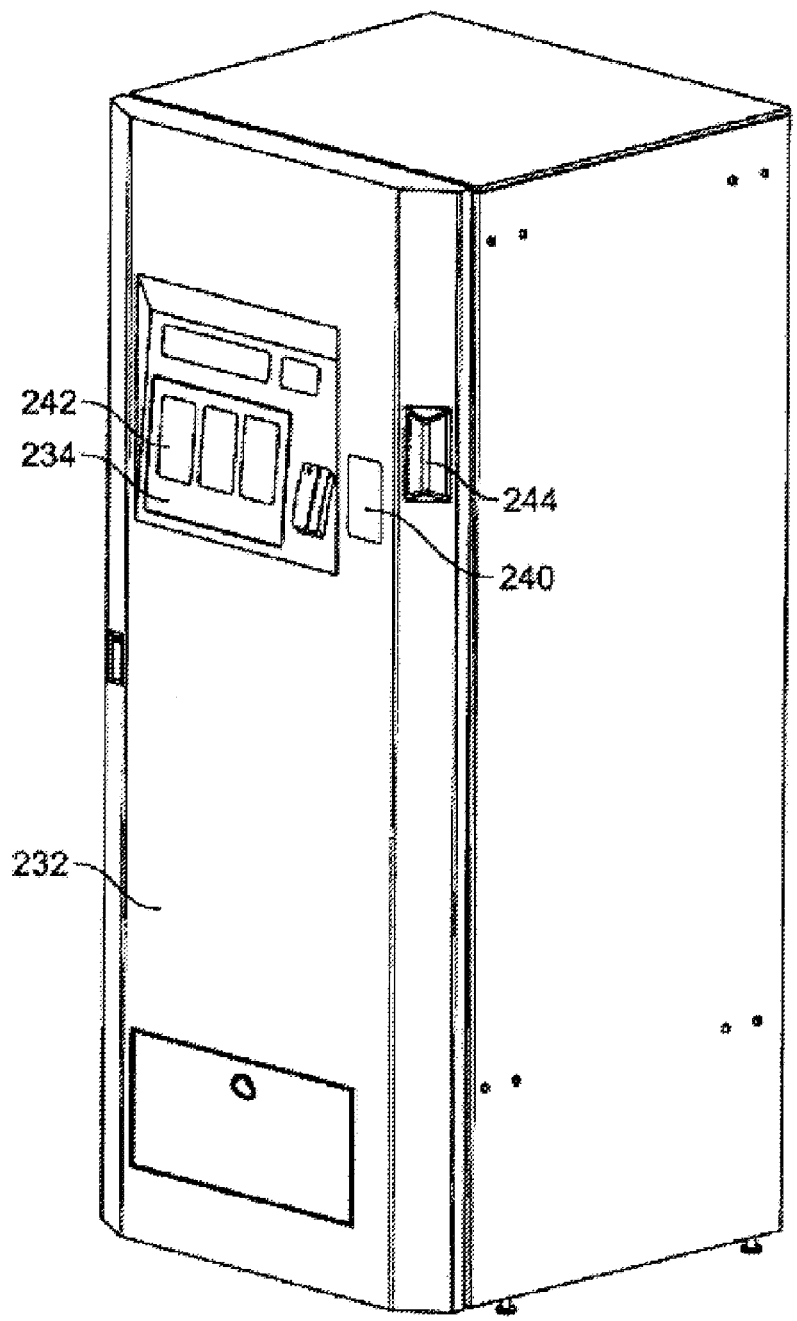
FIG. 2 is a perspective view of an article dispensing machine constructed in accordance with the principles of the present invention.

FIGS. 1-2 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Figure 3:
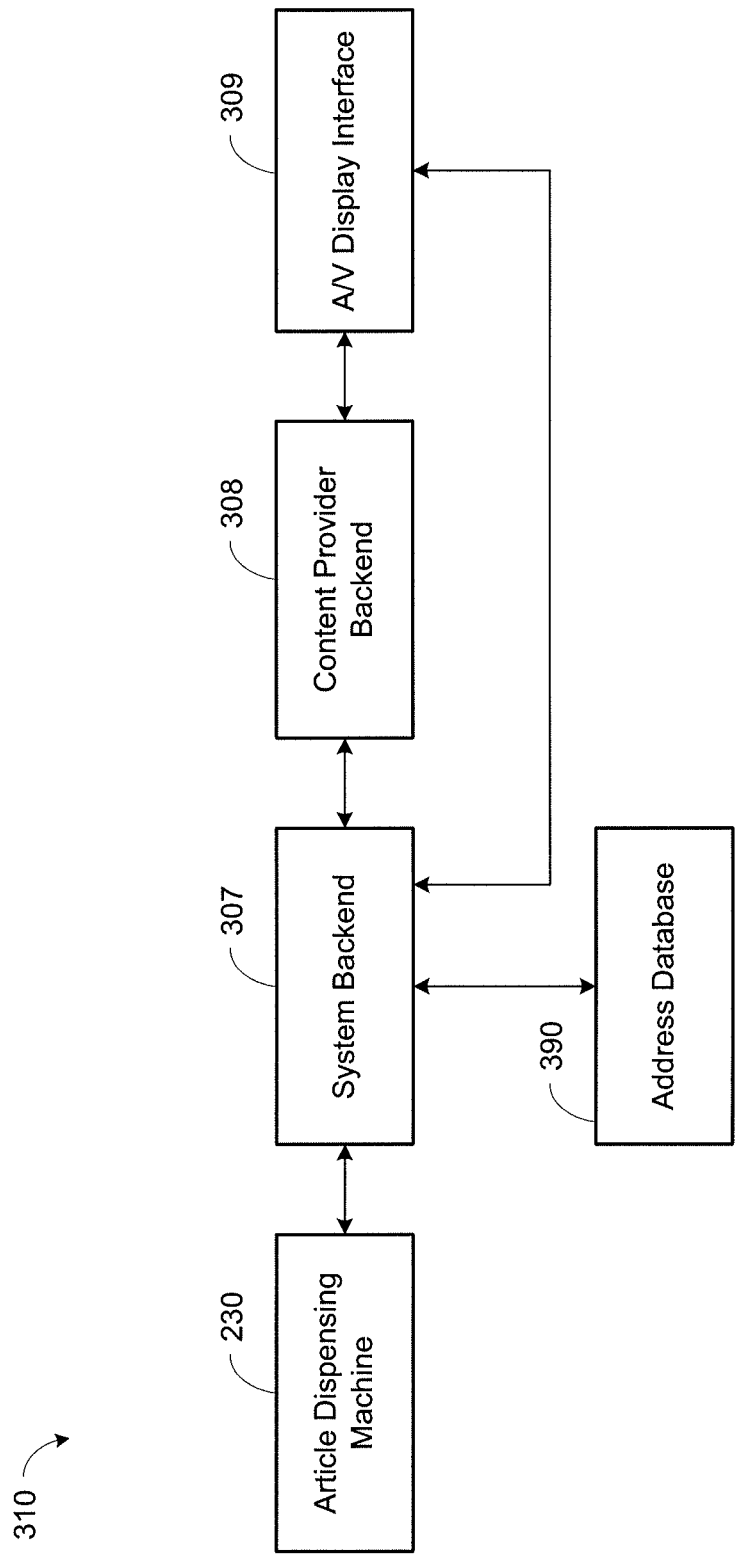
FIG. 3 is a high-level block diagram illustrating a networked media content system and connections including an article dispensing machine, a system backend, a content provider backend, and an A/V display interface.

Generally, in terms of hardware architecture, the central server 302 and the content provider backend 308 shown in FIG. 3 include a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the present invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, or MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a runtime Vxworks operating system from WindRiver Systems, Inc.; or (g) an appliance-based operating system, such as that implemented in handheld computers, smartphones, or personal digital assistants, (PDAs) (e.g., PalmOS available from Palm Computing, Inc., Windows CE or Windows Phone available from Microsoft Corporation, iOS available from Apple, Inc., Android available from Google, Inc., BlackBerry OS available from Research in Motion, Limited, Symbian available from Nokia Corp.). The operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 may also store information related to the geographic location of each article dispensing machine 230, such as the latitude and longitude, address, or other geographic location identifier of each machine 230. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 and databases in the content provider backend 308, such as the content provider customer profile database 502 and other databases, are preferably relational databases, although other types of database architectures may be used without departing from the principles of the present invention. For example, the databases 304 and 502 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304 and database 502. In one embodiment, .net and Microsoft Reporting Services are employed, however, other technologies such as ODBC, MySQL, CFML and the like may be used.

The central controller 302, central database 304, and components of the content provider backend 308 are also accessible by an electronic device 306, which may include a personal computer 102, mobile device 104 (e.g., smartphone, PDA, etc.), tablet computer 106, video game console 108, television 110, and Blu-Ray player 112. The electronic device 306 may be in direct or indirect communication with the central controller 302, central database 304 and/or the content provider backend 308 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard and a microprocessor. The electronic device 306 may also comprise Internet browser software such as Firefox, Internet Explorer, Chrome or Safari. Using the browser software, a user of electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the present invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302, central database 304, components of the system backend 307, and components of the content provider backend 308 using rules and specifications of an application programming interface (API).

In an embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

FIG. 3 illustrates a networked media content system 310 including an article dispensing machine 230, a system backend 307, a content provider backend 308, and an audio/visual (A/V) display interface 309. The networked media content system 310 provides for a variety of processes involving management, manipulation, searching, presentation, and notification related to digital content and vendible physical media articles, including processes related to the present invention for searching for media content in a metadata database. The networked media content system 310 allows for direct and indirect communication between the components in the networked media content system 310 via one or more networks. The components in the networked media content system 310 may be operated by one or more entities. In one embodiment, the article dispensing machine(s) 230 and the system backend 307 are operated by a first entity, such as the operator of the article dispensing machines, while the content provider backend 308 and the A/V display interface 309 are operated by a second entity, such as a content provider. In another embodiment, all of the components shown in the networked media content system 310 of FIG. 3 are operated by the same entity. The physical media article may include at least a DVD, Blu-Ray disc, video game disc, or other media article including those that are out-of-stock or otherwise unavailable for rental. The digital media selections may include streaming video content, video-on-demand content, downloadable video content, streaming video games, downloadable video games, or other digital media. Streaming or downloadable video games may include content related to video games, such as expansion packs and add-on packs. Although FIG. 3 shows a single content provider backend 308 and a single A/V display interface 309, it is contemplated that more than one content provider backend and/or A/V display interfaces may be in communication with the system backend 307.

The system backend 307 includes components that primarily communicate information, such as transaction and inventory data, to and from the article dispensing machines 230. Components in the system backend 307 also communicate information to and from the content provider backend 308 and the A/V display interface 309. The system backend 307 is detailed below with reference to FIG. 4. The content provider backend 308 includes components that primarily communicate information to and from the A/V display interface 309. Components in the content provider backend 308 also communicate information to and from the system backend 307, as detailed further below. Data communicated between the article dispensing machines 230, the system backend 307, the content provider backend 308, and/or the A/V display interface 309 may utilize the XML (Extensible Markup Language) format. The electronic device 306 and the A/V display interface 309 may communicate with the system backend 307 and/or the content provider backend 308 using rules and specifications of an application programming interface (API).

The A/V display interface 309 can be a fixed device or mobile device, including a set-top box, a module of an internet-ready television, a Blu-Ray player with internet connectability, a software application executing on a mobile device, cable television converter box, satellite television set-top box, IPTV (Internet Protocol television) set-top box (including AT&T U-Verse), digital video recorder, tablet computer, video game console (including Microsoft Xbox family, Sony PlayStation family, Nintendo Wii and similar devices), handheld gaming device (including Sony PlayStation Portable, Nintendo DS and similar devices), laptop computer, desktop computer, streaming media box (including Apple TV, Google TV, Roku, Boxee, and similar devices), or any other device capable of receiving and displaying streaming, on-demand and/or downloadable electronic media from a content provider. Moreover, applications may be installed and executed on the A/V display interface 309 that communicate with the system backend 307 and/or the content provider backend 308 to provide media content and other information to a user of the A/V display interface 309.

The article dispensing machines 230 can communicate with the system backend 307, including the central server and controller 302, via network communication equipment and circuitry, as detailed above. Furthermore, the system backend 307 can communicate with the content provider backend 308 and the A/V display interface 309 via the same or different network communication equipment and circuitry. In particular, the system backend 307 can directly communicate with the content provider backend 308 and the A/V display interface 309, or in one embodiment, the system backend 307 can communicate with the A/V display interface 309 through the content provider backend 308. It will also be understood that while a preferred embodiment of the present invention is for the components of the system 310 to have a "broadband" connection with one another, the principles of the present invention are also practicable with a dialup connection using a standard modem. Wireless network connections are also contemplated, such as wireless Ethernet, satellite, infrared radio frequency, Bluetooth, near field communication and cellular networks.

Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. In these cases, transaction data can be stored locally in the article dispensing machine 230, such as in the article dispensing machine memory storage device 281, until a predetermined time interval elapses, when a predetermined number of transactions is reached, or until communication with the central controller 302 can be reestablished. Once communication is established with the central controller 302, financial and inventory information can be uploaded and the appropriate servers and databases can be updated.

In an embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302, metadata database 410 and/or inventory database 412 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in the inventory database 412 can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article. Although a physically unavailable media article cannot be rented from the particular article dispensing machine 230, a digital alternative media selection may be available and substituted for the unavailable media article.

Figure 4:
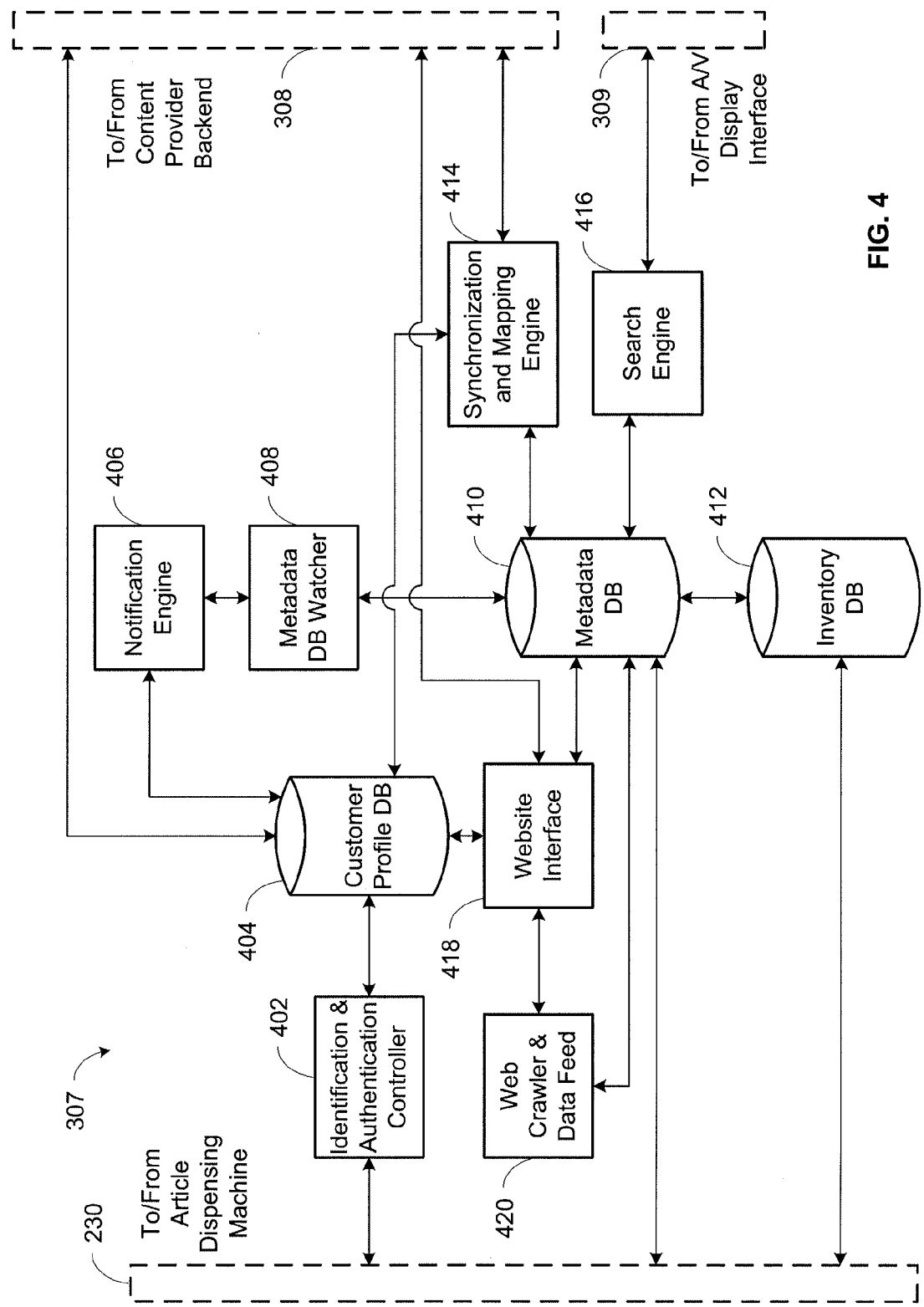
FIG. 4 is a block diagram illustrating the system backend.

FIG. 4 is a block diagram illustrating the system backend 307 and connections to and from the system backend 307 to the article dispensing machines 230, the content provider backend 308, and the A/V display interface 309. The system backend 307 includes components that provide and receive data to and from the article dispensing machines 230 during DVD, Blu-Ray disc, and video game rental transactions and other transactions. Components in the system backend 307 are utilized in relation to the present invention for searching for media content in a metadata database, as described below. It will be understood that components 402, 404, 406, 408, 414, 416, 418, and 420 in the system backend 307 may be implemented, for example, by the central controller 302 using instructions stored in a memory connected to the central controller 302. It will be further understood that the databases 404, 410, and 412 may be implemented as part of the central database 304 or as separate databases.

The identification and authentication controller 402 can receive a unique customer identifier that a customer provides to the article dispensing machines 230 during a rental transaction. The unique customer identifier can be a credit or debit card number, a hashed version of a credit or debit card number, or other unique identifier used for payment and/or identification purposes. In the case of hashing of the credit or debit card number, the hash function applied to the credit or debit card number is preferably implemented on the article dispensing machines 230 and may be, for example, a SHA-256 hashing algorithm. The identification and authentication controller 402 can validate the payment capability of a credit or debit card by communicating with the financial server 305.

Figure 5:
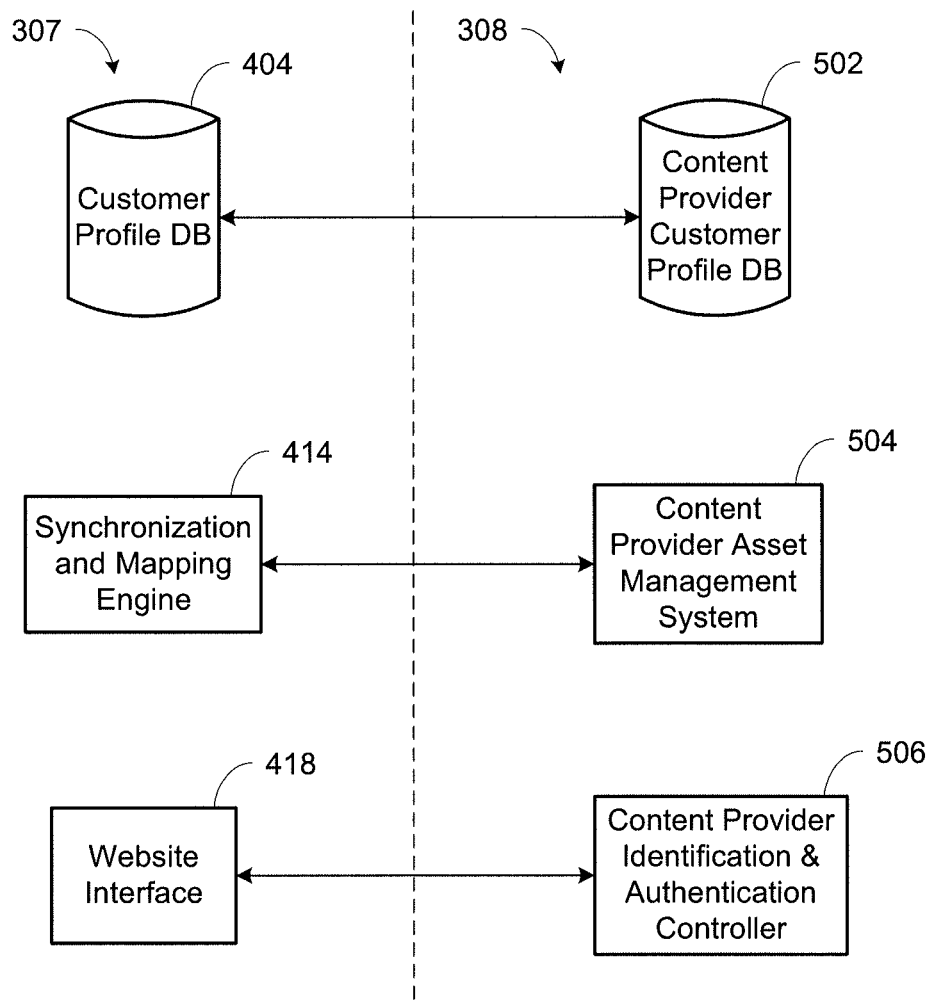
FIG. 5 is a block diagram illustrating connections between the system backend and the content provider backend.

A customer may be authenticated to multiple customer profiles and accounts by the identification and authentication controller 402. The unique customer identifier provided by the customer can authenticate the customer to an existing customer profile and account for the article dispensing machines 230. The existing customer profile and account can be stored and looked up using the unique customer identifier in the customer profile database 404 that is connected to the identification and authentication controller 402. The unique customer identifier can also link the existing customer account to a content provider customer account via a connection from the customer profile database 404 to the content provider customer profile database 502 in the content provider backend 308, as shown in FIG. 5. Zero, one, or more content provider customer accounts may be linked in the customer profile database 404 to the existing customer account for the article dispensing machines 230. A content provider may include, but is not limited to, a cable television operator, a satellite television service provider, an IPTV provider, an online gaming and digital media delivery service (Xbox Live, PlayStation Network, OnLive, etc.), a website (YouTube, Hulu, etc.), a movie studio, a television network, a game publisher or a retailer (Best Buy, Walmart, etc.). Media selections available from a content provider may include videos on demand, streaming videos, downloadable videos, streaming video games, or downloadable video games. The media selections may be available through the A/V display interface 309 that is in communication with the content provider backend 308.

The customer profile database 404 can contain information related to customers of the article dispensing machines 230, including name, mailing and billing addresses, email addresses, phone and mobile numbers, username, password, payment methods, rental history, purchase history, preferred article dispensing machines, movie and video game genre preferences, customizations, subscriptions, parental controls, linked content provider accounts, content provider subscriptions and entitlements, and other data. A rental transaction can be personalized using information from the customer profile database 404 at the article dispensing machines 230 and a website interface 418. For example, only certain genres and titles of DVDs, Blu-Ray discs or video games could be shown if a customer sets particular preferences that are then stored in the customer profile database 404. Some of the information stored in the customer profile database 404 may also be stored in the article dispensing machine database 282. The customer profile database 404 may include a service which facilitates interfacing and communicating with a notification engine 406 and other components of the system backend 307, for example.

The website interface 418 can be interactive and accessible to a customer using web browser software at an electronic device 306. The website interface 418 may also include a mobile application or consumer electronics device application. Rentable media articles may be searched, browsed, and reserved on the website interface 418 for receipt at the article dispensing machines 230. The location of and the inventory at article dispensing machines 230 can be viewed at the website interface 418. Digital media selections from content providers, such as streaming, downloadable, and on-demand media, may also be searched, browsed, and accessed on the website interface 418. A customer can access their customer profile on the website interface 418 for purposes of verifying and updating their personal information in the customer profile database 404. For example, a customer can link an account they have with a content provider on the website interface 418 by specifying their username, password, account number, and/or other identifying information for the content provider account. The system backend 307 can utilize SAML (Security Assertion Markup Language), OAuth (Open Authentication), or other protocols to authenticate the identity of the customer at the content provider via a connection from the website interface 418 to the content provider identification and authentication controller 506 in the content provider backend 308, as shown in FIG. 5. If the identifying information matches the content provider account, the linkage to the content provider account can be stored in the customer profile database 404.

Like website interface 418, rentable media articles may be searched, browsed, and reserved through A/V display interface 309 for receipt at the article dispensing machines 230. For example, an application executing on the A/V display interface 309 may be accessed by a customer. The location of and the inventory at article dispensing machines 230 can be viewed at A/V display interface 309. A user may use A/V display interface 309 to display all dispensing machines 230 that are within a requested proximity that match search criteria. Using personally indentifying information, such as the IP or MAC address of A/V display interface 309, the proximity of, or distance from the user to, dispensing machines 230 may also be viewed at A/V display interface 309. Other personally identifying information may also be used, such as a digital certificate identifier or serial number. It is understood by those in the art that an IP address is a numerical label assigned to any device participating in a computer network that uses the Internet Protocol for communication. It is also understood by those in the art that a MAC address is a unique hexadecimal identifier assigned to a network interface of a device. The MAC address of the A/V display interface 309, for example, may be associated with a customer profile that contains an address. The geographic location that corresponds to an IP or MAC address may be stored in an address database 390 that may be part of central database 304 or metadata database 410, or may be another database located at a remote location.

A/V display interface 309 may access the address database 390 to determine the geographic location of A/V display interface 309, and then may use mapping APIs, mapping data, or mapping services, such as Google Maps, Bing Maps, Navteq, Mapquest, Tele Atlas, or similar providers, to display the dispensing machines 230 that are proximate to A/V display interface 309. By way of example, and in no way limiting, A/V display interface 309 may display all dispensing machines 230 that are within a 5 mile radius of A/V display interface 309. In another example, A/V display interface 309 may display all dispensing machines 230 in a 10 mile radius that currently have a specific media article in stock. As a further example, a user interface of an application executing on the A/V display interface 309 may be modified based on the geographic location of the A/V display interface 309. The user interface can be modified to show popular rentable media articles in an area corresponding to the geographic location, themed user interface information or media articles related to the area corresponding to the geographic location, or other modifications.

The address database 390 may be located on central controller 302, or may be part of central database 304. Alternatively, the address database 390 may be proprietary to a third party, and A/V display interface 309 may utilize a third party service provider or database, such as Quova, to access the address database 390 to determine the geographic location of A/V display interface 309.

An inventory database 412 may contain a catalog of physical media articles that may be rented at the article dispensing machines 230 and reserved at the website interface 418 for later receipt at the article dispensing machines 230. A catalog of digital media selections available at the content provider can be contained in the metadata database 410. Metadata for each of the media articles and media selections are stored in the metadata database 410, including title, release date, running time, chapter information, technical details (resolution, audio options, languages, etc.), format, peripheral device requirements, number of players, online capability, actors, voice actors, director, studio, publisher, developer, platform, availability of downloadable content, episode information, genre, critic ratings, individualized ratings (reviews, recommendations, likes, etc.), parental ratings (MPAA, ESRB, TV Parental Guidelines, etc.), description, related content, media artwork, media stills, and other information.

Physical media articles that may be rented at the article dispensing machines 230 and digital media selections available at the content provider may be synchronized and mapped to one another by matching their respective metadata. As seen in FIG. 5, a synchronization and mapping engine 414 connected to the customer profile database 404, the metadata database 410, and the content provider asset management system 504 in the content provider backend 308 may compare the metadata for the media articles and media selections to determine matches. Metadata in the content provider asset management system 504 for media selections can be compared to metadata in the metadata database 410 to perform the matching. For example, a combination of a title, release date, running time, and/or actor information can be used to map a media article to a corresponding media selection. In one embodiment, proprietary identification codes unique to a media article and a media selection can be used to map the media article to the corresponding media selection. The proprietary identification codes for the media article and the media selection can be stored in the metadata database 410 and the content provider asset management system 504, respectively. Such proprietary identification codes can be assigned to media articles and media selections by third party providers such as Rovi, Baseline, and AMG.

Figure 6:
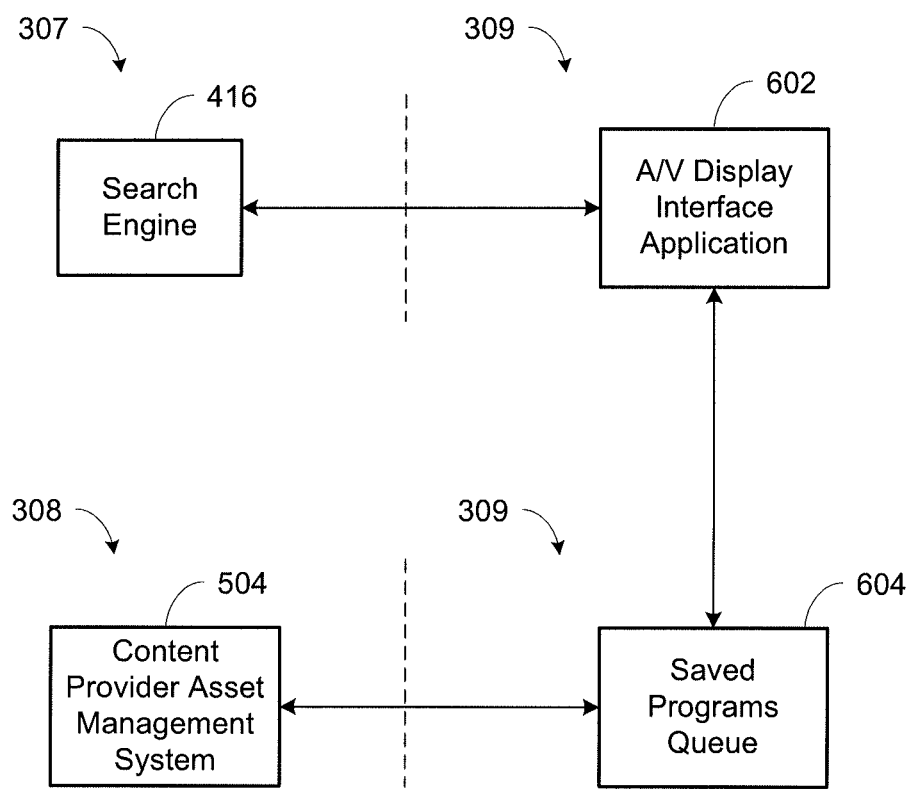
FIG. 6 is a block diagram illustrating connections between the system backend, the content provider backend, and the A/V display interface.

A media selection at a content provider can be placed in the saved programs queue 604 on the A/V display interface 309, as shown in FIG. 6, by providing the appropriate instructions to the content provider asset management system 504 in the content provider backend 308. Queuing a media selection may occur, for example, when a customer decides to purchase the digital media selection from the content provider in place of a physical media article at an article dispensing machine 230.

An inventory database 412 can be connected to the article dispensing machine 230 and the metadata database 410 to provide information regarding the availability of media articles in the article dispensing machines 230. In conjunction with a search engine 416, the inventory database 412 and the metadata database 410 can provide inventory results for media articles and media selections to an A/V display interface application 602 on an A/V display interface 309, as shown in FIG. 6. Such results may include the availability of physical media articles at the article dispensing machines 230 as well as digital media selections available at a content provider. The results may also be provided to the website interface 418 or other websites operated by a content provider, for example. The synchronization and mapping engine 414 can store the information from the content provider asset management system 504 regarding media selections at the content provider in the metadata database 410. The inventory database 412 can also supply the availability of media articles in the article dispensing machines 230 to the website interface 418 or to other portals, such as an application on a mobile device, when queried.

A metadata database watcher 408 can monitor the metadata database 410 for changes in metadata, media articles, and/or media selections. The metadata database watcher 408 can use customer watchlist subscriptions from a customer profile in the customer profile database 404 to determine what changes to monitor. The changes to the metadata can include inventory availability, content provider availability, release schedules, and other information related to a particular title. The customer watchlist subscriptions can be used by the metadata database watcher 408 to monitor these changes in combination with information regarding particular actors, directors, and other information. When a change corresponding to a customer watchlist subscription is found by the metadata database watcher 408, a notification engine 406 can transmit notifications and details of the change to the customer. The notifications may be sent via email, SMS, mobile application alerts, set-top box notification, or other electronic channels.

A customer may also subscribe to be notified about new information regarding their favorite actors, directors, titles, studios, and other parameters. Such information may include information related to live performances, television appearances, news and magazine articles, blogs, and other content. A web crawler and data feed 420 can obtain this information by searching pertinent websites and use of a public API to feed the metadata database 410. The customer can subscribe to this information about their favorites at the website interface 418, for example. The metadata database watcher 408 monitoring the metadata database 410 can detect when there is a new piece of information about a favorite and transmit the desired notifications using the notification engine 406.

Figure 7:
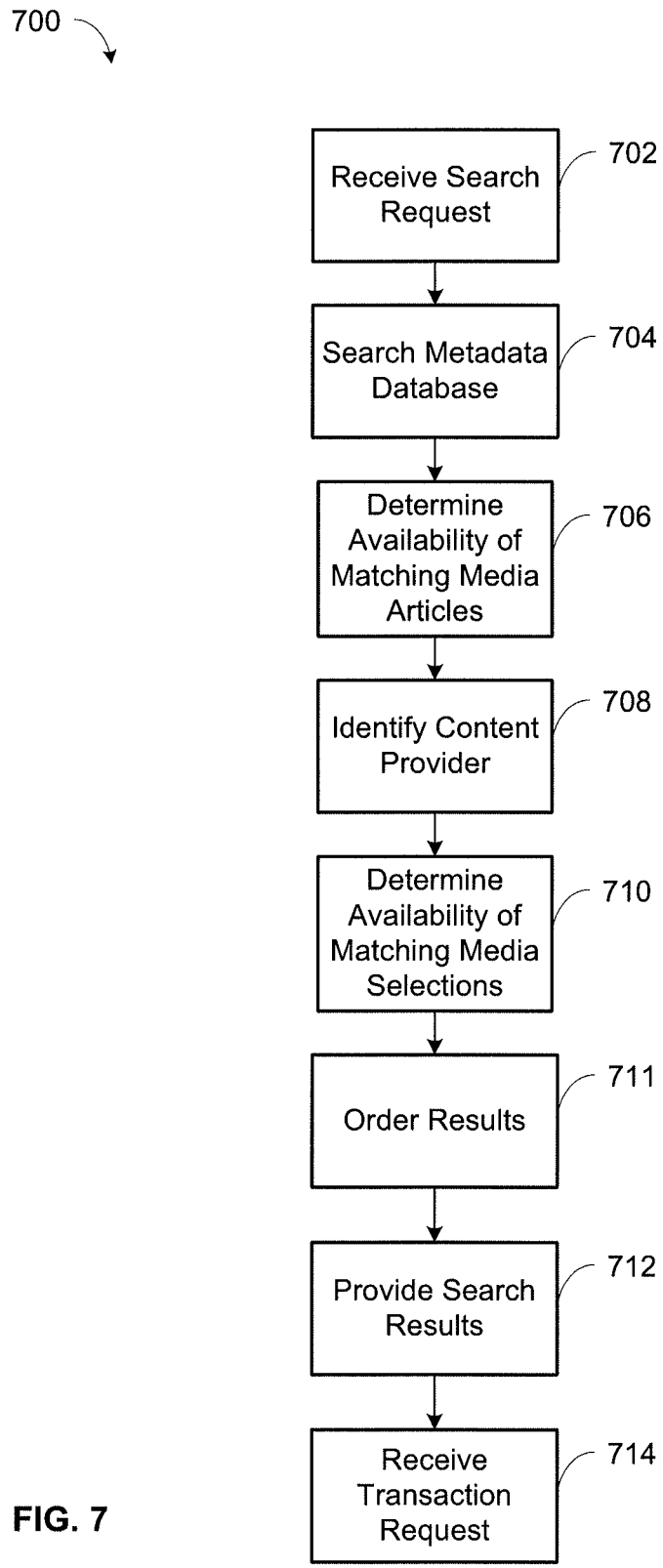
FIG. 7 is a flowchart illustrating operations for searching for media content in a metadata database.

An embodiment of a process 700 for searching for media content in a metadata database using the search engine 416 is shown in FIG. 7. The process 700 can result in a search result set that includes media articles and media selections that match search criteria in the metadata database. Searching for media content may include matching keywords in search criteria or using predefined search criteria for browsing of static or dynamic listings of media content. The metadata database 410 can contain metadata information for one or more physical media articles, such as DVDs, Blu-Ray discs, and/or video games, and one or more digital media selections, such as streaming videos, videos-on-demand, streaming video games and/or downloadable video games. An inventory database 412 can be in communication with the metadata database, and contain information regarding the availability of media articles at the article dispensing machines 230. The availabilities of the matching media articles and the matching media selections can also be returned in the search result set produced by the process 700. As discussed above, metadata for the media articles and the media selections may include title, release date, running time, chapter information, technical details, format, peripheral device requirements, number of players, online capability, actors, voice actors, director, studio, publisher, developer, platform, availability of downloadable content, episode information, genre, critic ratings, individualized ratings, parental ratings, description, related content, media artwork, media stills and other information.

Matching media articles corresponding to the search criteria can include media articles that directly match the search criteria and/or media articles that are indirectly associated with the search criteria. Similarly, matching media selections may directly or indirectly match the search criteria. For example, if the search criteria include the keyword "Camelot", the search result set provided by the process 700 may include direct matches, such as a media selection listing for the television series Camelot on the premium cable channel Starz, available as a video-on-demand, and a media article listing for the 1967 movie Camelot, available for rental from an article dispensing machine 230. The search result set may also include indirect matches for associated media articles and associated media selections, such as the King Arthur video game or the Merlin television miniseries on DVD, that are available at an article dispensing machine 230 and/or from a content provider. Metadata for the associated media articles and media selections may match the search criteria, which can cause the associated media articles and media selections to be included in the search result set. In the example above, the Merlin television miniseries may appear in the search result set because the search criteria "Camelot" may match a plot keyword in the metadata of that particular media article. In an alternative embodiment, the indirect matches may appear in the search result set due to metadata from the direct matches. The metadata from the direct matches may not directly match the search criteria, but instead lead to the indirect matches. In the example above, the King Arthur video game may appear in the search result set not because the search criteria "Camelot" is in the metadata for the video game, but because the direct matched television series Camelot has metadata including "King Arthur".

In some embodiments, the rental or purchase history of the customer from the customer database 404 may also be utilized in conjunction with the metadata of the media article, as described above, to determine matching media articles and matching media selections. For example, if a customer attempts to search for the movie Return of the Jedi, indirect matching media selections may be determined, such as the movies The Empire Strikes Back and Star Wars Episode I: The Phantom Menace. The indirect matching media selections may be determined based on metadata for the movie Return of the Jedi and/or the prior rental history of the customer that may include, for example, rentals of the movie Star Wars and the video game Star Wars: Battlefront.

The search result set provided by the process 700 may also be ordered or ranked by combinations of criteria, such as by price, version, video quality, audio quality, availability, release date, and/or other factors, including the metadata described above. Versions of media articles and media selections may differ based on the aspect ratio of the media (4:3, 16:9, and others), ratings, geographical restrictions, special features, three-dimensional content, or other differences. The video quality of media articles and media selections may differ due to the resolution of the media, such as 480p, 480i, 720p, 1080i, and 1080p. Audio quality may vary for media articles and media selections, such as by the type of multichannel audio technology (Dolby Digital, DTS, and others) and number of audio channels (9.1, 7.1, 6.1, 5.1, stereo, mono, and others). The availability and release date of media articles and media selections may include whether a certain title is "coming soon" to or "leaving soon" from an article dispensing machine 230 or a content provider, for example. Availability and release dates may also be designated by studios that produced and created the media. In one embodiment, one or more recommendations for the best viewing option(s) may be provided to the user based on the criteria. For example, the viewing option with the lowest price and the highest video resolution that is currently available to access may be highlighted in the search result set. In another embodiment, the criteria may be displayed with results in the search result set so that the user can decide which option they would like to access.

At step 702, a search request can be received at the search engine 416. The search request includes search criteria, search keywords, and/or search phrases from a user that wishes to search the metadata database 410 and/or the inventory database 412 for a media article or a media selection. The search request may also include a request for the geographic proximity from the user's location to any dispensing machines 230. The search request may be received from a website accessed by the electronic device 306, such as the website interface 418 or website operated by a content provider; an A/V display interface application 602 executing on an A/V display interface 309 or the electronic device 306; or from any other device or portal capable of transmitting the search request to the search engine 416. For example, a user using the website interface 418 may wish to search for media articles available at an article dispensing machine 230. As another example, a user may be using a website operated by a content provider and desires to search for media selections provided by the content provider. In either example, the process 700 may provide a search result set that includes both matching media articles and matching media selections that correspond to the search criteria in the user's search request. The search result set provided by the process 700 therefore aggregates physical matching media articles and digital matching media selections.

The search request received at step 702 may also include a browsing request that uses predefined search criteria for browsing of static or dynamic listings of media content. The browsing request may be received from a user that wishes to browse the metadata database 410 and/or the inventory database 412 for a media article or a media selection. The browsing request may include browsing an entire catalog of media content and/or browsing by genre, format, rating, popularity, platform, release date, and/or other metadata. The search criteria or keywords related to a browsing request may include predefined search criteria or keywords that result in the listing of matching media articles and matching media selections that match the predefined search criteria or keywords. For example, a user using the website interface 418 may wish to browse for media articles at an article dispensing machine 230 that are only in the action genre and in Blu-Ray format. Predefined search criteria would be used so that only media articles in the action genre and in Blu-Ray format are listed. The process 700 may provide a search result set that includes both matching media articles and matching media selections that correspond to the search criteria in the browsing request.

At step 704, the metadata database 410 can be accessed by the synchronization and mapping engine 414 to search for metadata of the media articles and media selections that match the search criteria received in the search request at step 702. In one embodiment, the media articles have been obtained from the inventory database 412 and their corresponding metadata from the metadata database 410, and the media selections in the metadata database 410 and their corresponding metadata have been obtained from the content provider asset management system 504 via the synchronization and mapping engine 414. When the metadata database 410 is searched at step 704 in this embodiment, matching media articles and matching media selections that directly and indirectly match the search criteria are found and stored for later use in the process 700. As detailed above, indirect matches may include media articles and media selections that are not directly associated with the search criteria. In some embodiments, only direct matches based on the search criteria can be found and stored.

Figure 8:
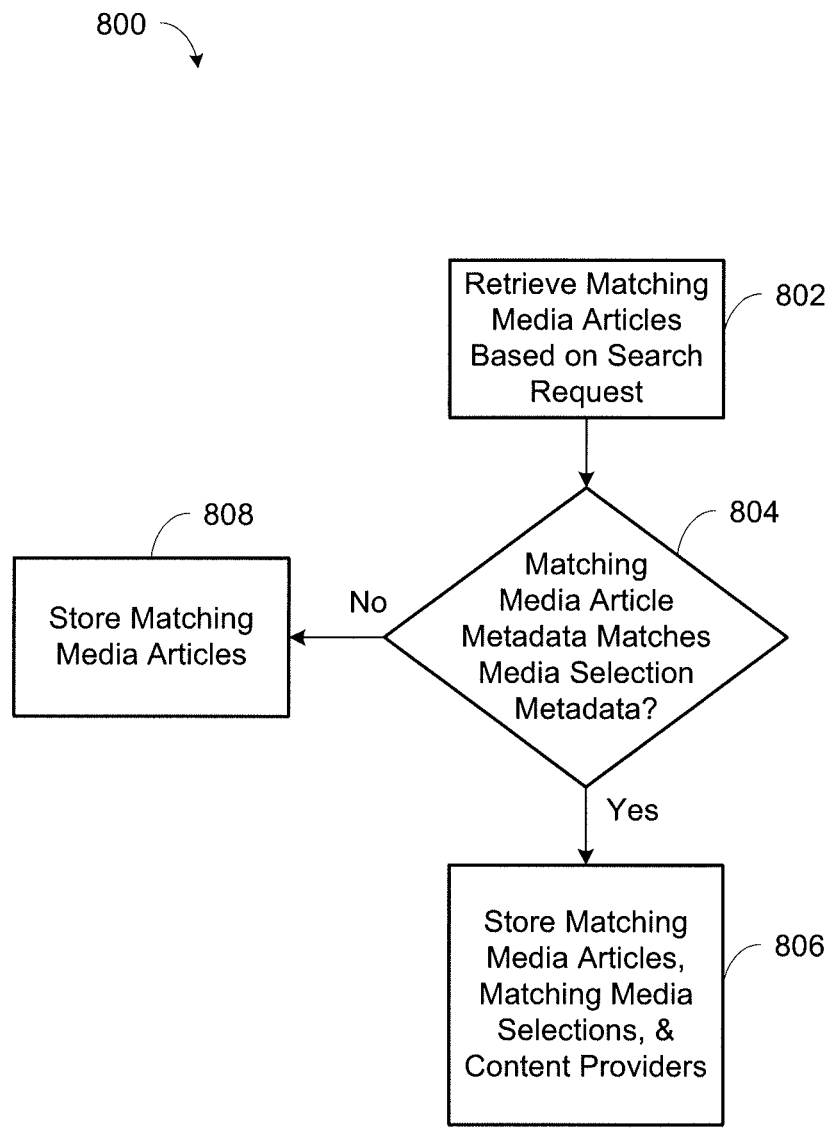
FIG. 8 is a flowchart illustrating an embodiment of operations for searching a metadata database in response to a search request in the search operation of FIG. 7.

In other embodiments, the media articles and the media selections in the metadata database 410 will be mapped to one another based on their respective metadata at step 704. One embodiment shown in FIG. 8 is a process 800 that is performed in step 704 of the process 700, in which media articles matching the search criteria may be retrieved first, followed by using metadata of the matching media articles to find matching media selections. At step 802, the matching media articles are retrieved from the metadata database 410, based on the search criteria in the search request. It can be determined at step 804 whether the metadata of the matching media articles matches the metadata of one or more media selections in the metadata database 410. For example, a combination of the title of a movie and the release year may allow a match of a movie DVD or Blu-Ray disc to a streaming movie, downloadable movie or video-on-demand that may be available from a content provider. As another example, a combination of the title of a television series, the episode title, episode number, and release year may allow a match of a television show DVD or Blu-Ray disc to a media selection available from a content provider. As a further example, a combination of the title of a video game release date, and publisher may allow a match of a video game to a streaming or downloadable game from a content provider. In the case of a movie or television show, if a match between the matching media article and a media selection is not found with the title, episode, and/or release year information, the synchronization and mapping engine 414 could also utilize the running time of the movie or television show and the names or initials of the top-billed actors. It will be understood that metadata in any combination may be used to obtain a mapping of media articles to media selections. If no match between a matching media article and a media selection is found at step 804, the central controller 302 may store only the matching media articles at step 808 for later use in the process 700. However, if a match is found at step 804, the matching media articles, the matching media selections, and the associated content providers are stored at step 806 for later use in the process 700.

Figure 9:
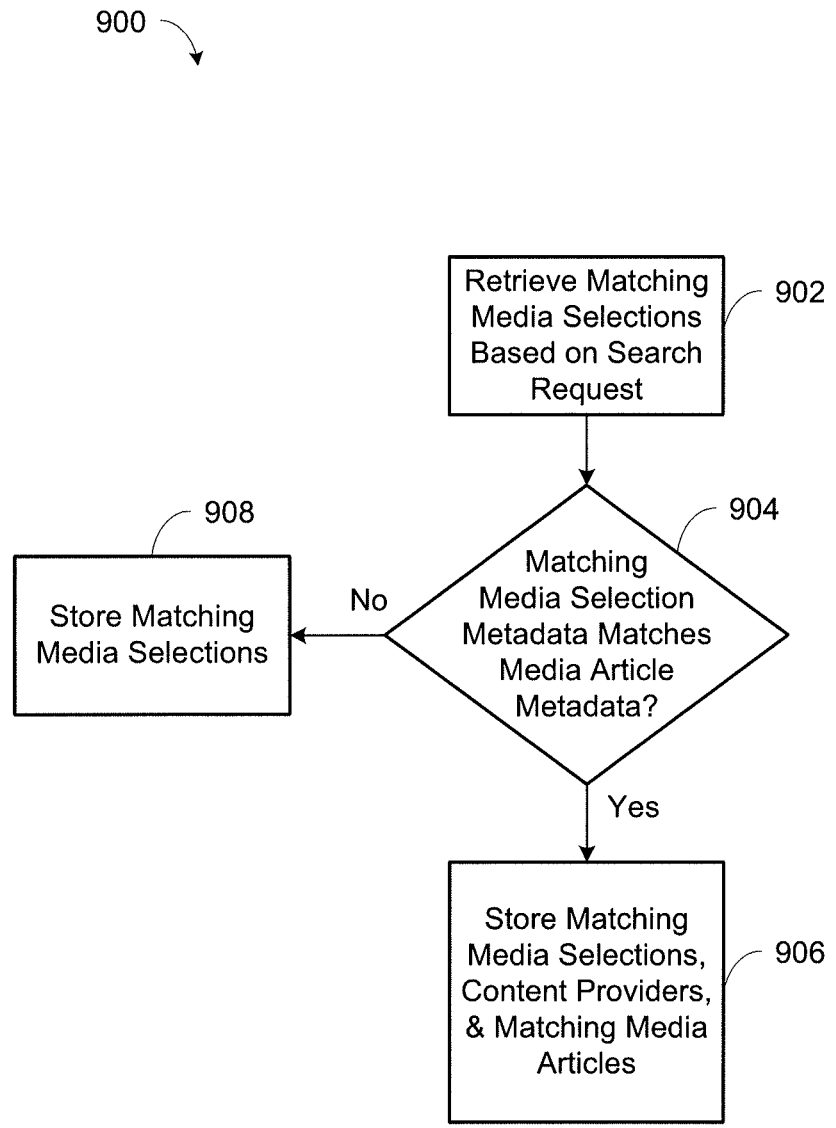
FIG. 9 is a flowchart illustrating an alternate embodiment of operations for searching a metadata database in response to a search request in the search operation of FIG. 7.

Another embodiment shown in FIG. 9 is a process 900 that is performed in step 704 of the process 700, in which media selections matching the search criteria may be retrieved first, followed by using metadata of the matching media selections to find matching media articles. At step 902, the matching media selections are retrieved from the metadata database 410, based on the search criteria in the search request. It can be determined at step 904 whether the metadata of the matching media selections matches the metadata of one or more media articles in the metadata database 410. The matching performed at step 904 is similar to the matching performed at step 804 in the process 800 described above using one or more combinations of the metadata. If no match between a matching media selection and a media article is found at step 904, the central controller 302 may store only the matching media selections at step 908 for later use in the process 700. However, if a match is found at step 904, the matching media selections, the associated content providers, and the matching media articles can be stored at step 906 for later use in the process 700.

Figure 10:
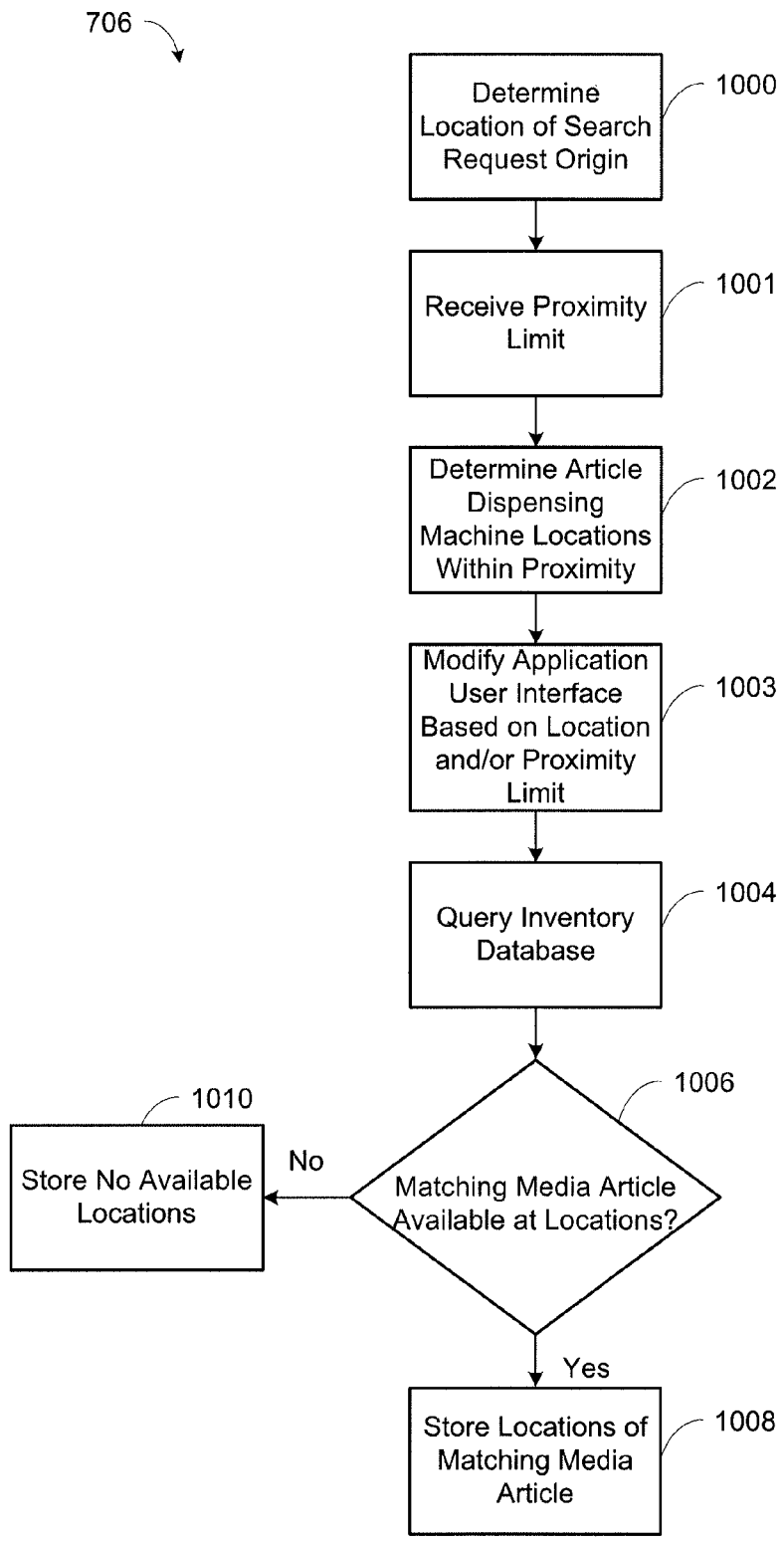
FIG. 10 is a flowchart illustrating operations for determining an availability of a matching media article in the search operation of FIG. 7.

Referring back to FIG. 7, following the search of the metadata database 410 at step 704, the availability of matching media articles can be determined at step 706 by the central controller 302. An embodiment of step 706 in the process 700 is shown in FIG. 10. At step 1000, the geographic location from where the search request originated from can be determined. This geographic location may be determined based on the IP address, MAC address, or digital certificate identifier of A/V display interface 309, for example. If the IP address is used, the IP address may be mapped to the geographic location in an address database 390 or other database, as described above. If the MAC address or digital certificate identifier is used, a customer profile that is associated with the MAC address or digital certificate identifier may be retrieved from the customer profile database 404, for example. Information in the customer profile may then be used as the geographic location determined at step 1000.

Regardless of whether an IP address, MAC address, digital certificate identifier, or other personally identifying information is used, the geographic location determined at step 1000 may include an address, a zip code, a neighborhood, or other geographic identifier. At step 1001, a proximity limit may be received that can limit the search for locations of the article dispensing machines 230 around the geographic location determined at step 1000. The proximity limit may be received from a user or may be a predetermined default proximity limit or radius. The proximity limit may include a mile radius, a kilometer radius, or other limit. Based on the geographic location from where the search request originated at step 1000 and the proximity limit received at step 1001, the article dispensing machines 230 that are located within the proximity limit may be determined at step 1002.

The geographic location determined at step 1000 and/or the proximity limit received at step 1001 may be used to modify a user interface of an application executing on the A/V display interface 309 at step 1003. For example, the user interface can be modified to show popular rentable media articles by other users or customers in an area within the proximity limit of the geographic location, themed user interface information or media articles related to the area within the proximity limit of the geographic location, and other modifications.

At step 1004, the inventory database 412 can be queried to determine whether the matching media articles are available at the locations of the article dispensing machines 230 found at step 1002. If the matching media articles are available at one or more article dispensing machines 230 at step 1006, then at step 1008, the locations of those article dispensing machines 230 can be stored for later use in the process 700. However, if the matching media articles are not available at any article dispensing machine 230 at step 1006, then no available locations can be stored at step 1010.

Figure 11:
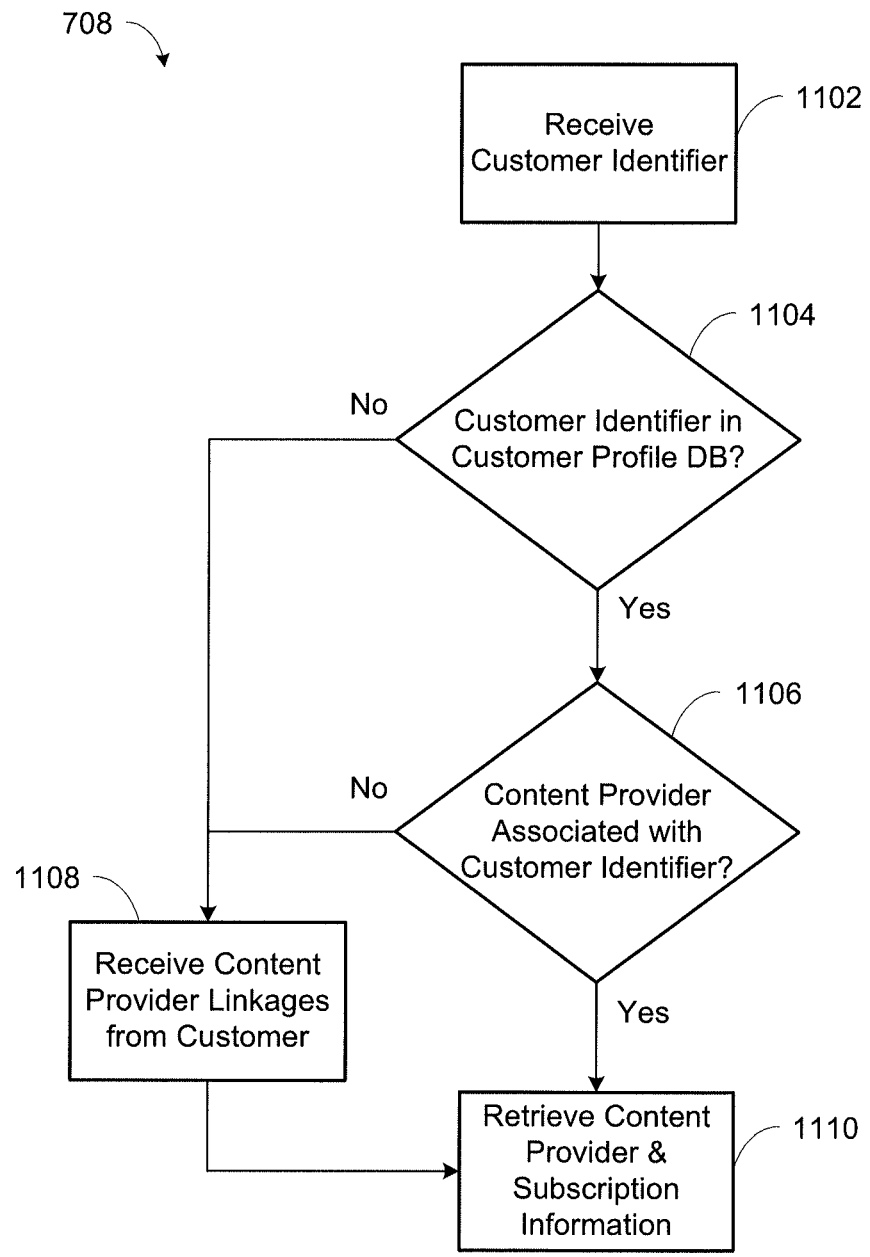
FIG. 11 is a flowchart illustrating operations for identifying an associated content provider in the search operation of FIG. 7.

Returning to FIG. 7, following step 706, associated content providers for matching media selections may be determined at step 708. A preferred embodiment of step 708 in the process 700 is shown in FIG. 11. At step 1102, a unique customer identifier may be received by the central controller 302. The central controller 302 can match the unique customer identifier to a particular customer profile in the customer profile database 404. The unique customer identifier could be a credit or debit card number processed through a hash function. The hashed credit or debit card number can be used to look up a customer profile in the customer profile database 404. The unique customer identifier may also include a customer-provided identification of the associated content provider. The customer could also provide what content providers they are associated with, and optionally provide the specific subscription package they subscribe to, instead of providing a credit card number or account number.

If the unique customer identifier is present in the customer profile database 404 at step 1104, then the process continues to step 1106. At step 1106, the central controller 302 can determine whether there is an associated content provider linked to the customer profile found at step 1104. The customer profile in the customer profile database 404 may contain a linkage to an associated content provider. If there is not a content provider associated with the customer profile at step 1106 or if no unique customer identifier is found in the customer profile database 404 at step 1104, the customer may provide the linkages of content providers at step 1108. The customer profile in the customer profile database 404 can include information obtained from the content provider customer profile database 502 in the content provider backend 308, such as an account number, email address, subscription information, and other information related to the customer's content provider customer profile.

If there is a content provider associated with the customer identifier at step 1106, the process continues to step 1110 where subscription information at the content provider for the customer is retrieved from the customer profile database 404. The customer profile database 404 may contain subscription and entitlement information that was previously received from the content provider customer profile database 502 in the content provider backend 308. Subscription information at the content provider can include the customer's subscribed service package, premium channel content the customer entitled to access, zip code and address for possible geographical content restrictions, parental authorization and controls for age authentication, and other subscriber information. The subscription information may be used by the central controller 302 at step 710 when determining the availability of matching media selections for the customer at particular content providers. Step 1110 is also performed following step 1108 when a customer has entered a linkage to a content provider.

Figure 12:
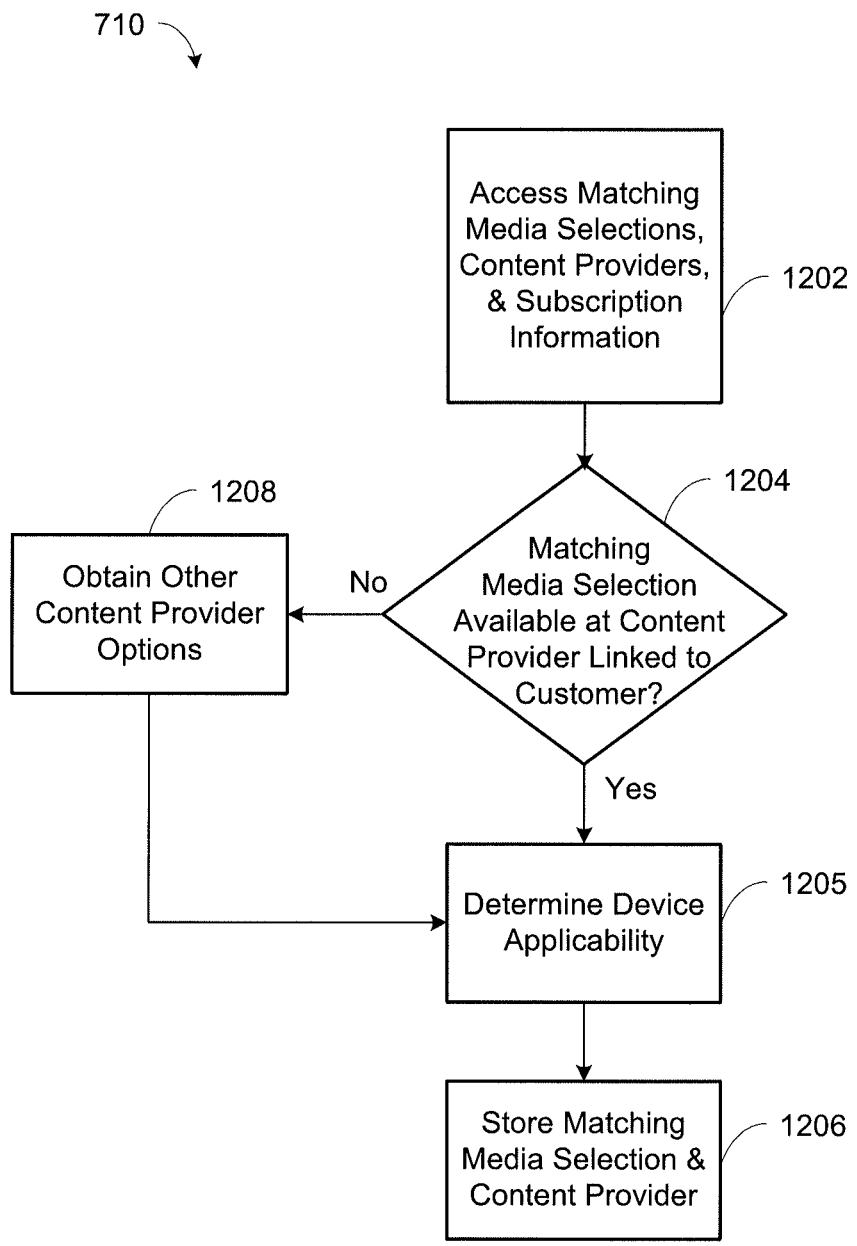
FIG. 12 is a flowchart illustrating operations for determining an availability of a matching media selection in the search operation of FIG. 7.

Following step 708 in FIG. 7, the availability of matching media selections can be determined at step 710. An embodiment of step 710 in the process 700 is shown in FIG. 12. At step 1202, the matching media selections, associated content providers, and subscription information may be accessed. This information may have been supplied and stored previously at step 708 and in particular, steps 1106, 1108, and 1110. At step 1204, the central controller 302 determines whether the matching media selections are available at a content provider that is linked to the customer. In addition to determining whether the matching media selections are available at a linked content provider, the central controller 302 can determine at step 1204 whether the customer has permission to access the matching media selection based on the subscription information in the customer profile database 404 that was previously obtained at step 1110.

A customer may be entitled to access a digital matching media selection for free, such as when the matching media selection is already available within the customer's subscription package, or when the matching media selection is publicly available. In other cases, a customer may only have access to a matching media selection by providing additional payment, such as when the customer's subscription package does not allow access to the matching media selection or when the matching media selection is only available at an a la carte content provider. For example, if the customer's subscription package allows access to Home Box Office (HBO) content and the matching media selection is available through HBO, then the customer will have access to the matching media selection without additional payment. As another example, if the customer's subscription package only allows access to Showtime content and the matching media selection is only available through HBO, then the customer will not have access to the matching media selection. In this case, the customer may have the option to upgrade their subscription package to include HBO or utilize an a la carte content provider for an additional payment. As a further example, if the customer is a Comcast subscriber and the matching media selection is available as a free video-on-demand selection on Comcast, then the customer will have access to the matching media selection without additional payment. However, if the matching media selection is only available through Hulu Plus, then the customer will not have access to the matching media selection unless the customer provides additional payment.

If the matching media selection is available at a linked content provider at step 1204, the process 710 continues to step 1205 to determine the device applicability of the matching media selection. A matching media selection may be available in one or more formats, depending on the technical details of the matching media selection, such as version, video quality, and audio quality. If the A/V display interface 309 that is to display the matching media selection does not support the technical details of the matching media selection, then the matching media selection may be removed from the search result set. For example, the matching media selection may only be available in 1080p high definition resolution. If the A/V display interface 309 cannot display 1080p resolution, then the A/V display interface 309 does not support display of the matching media selection and the matching media selection can be removed from the search result set. As another example, the matching media selection may be available in 5.1 channel audio format and in mono audio format. If the A/V display interface 309 only supports mono audio format, then the matching media selection in 5.1 channel audio format can be removed from the search result set. However, the matching media selection in mono audio format can remain in the search result set. By determining the device applicability of the matching media selection at step 1205, only the applicable and appropriate matching media selections will be included in the search result set provided by the process 700. At step 1206, the applicable matching media selections and associated content providers can be stored for later use in the process 700.

If the matching media selection is not available at a linked content provider at step 1204, then the central controller 302 can obtain other content provider options, if any, at step 1208. Other content provider options may include a la carte content providers such as Amazon Instant Video, iTunes Store, YouTube, VUDU, and other services that allow a user to individually purchase media without requiring a subscription. Further content provider options that may be obtained at step 1014 include retailers that grant rights to a digital media selection in conjunction with the purchase of a physical item (e.g., Best Buy, Walmart, etc.), movie studios, television networks, video game developers, and online gaming delivery services (Xbox Live, PlayStation Network, OnLive, etc.). For example, a video game may be available from an online gaming delivery service for download, such as from Xbox Live or the PlayStation Network, or for streaming, such as from OnLive. If other content providers are available for the matching media selection, the process 710 can also continue to step 1205 to determine the device applicability of the matching media selection, as described above. At step 1206, the matching media selections and a la carte content providers can be stored for later use in the process 700.

Returning to FIG. 7, the available matching media articles from step 706 and the available matching media selections from step 710 can be ordered at step 711. The filtering at step 711 may include ordering or ranking of the matching media articles and matching media selections, as described earlier, by criteria such as price, version, video quality, audio quality, availability, release date, and/or other factors, such as by metadata. Furthermore, one or more recommendations for the best viewing options may be provided to the user based on the criteria. For example, the best viewing options may include recommending the piece of media content that has the lowest price and the best video quality. As another example, the best viewing options may include recommending the piece of media content with high definition video quality that will be available in a week ("coming soon"), such as a Blu-Ray disc, as compared to another piece of media content that has standard definition video quality and is available now, such as a streaming video in 480p resolution.

Following step 711, the search result set can be provided at step 712. For example, the search result set may be transmitted to the A/V display interface 309 for display to the user who initiated the search request. The search result set may include matching media articles that are available at article dispensing machines 230 closest to the location where the search request originated. The search result set may also include matching media selections that are available at associated content providers and that are accessible based on the subscription package of a user. The user may also be shown options to access the matching media articles in the search result set and the matching media selections and commence a transaction. For example, options may be displayed for renting, reserving, or pre-reserving a matching media article at the article dispensing machine 230. Further options may be displayed for viewing, downloading, saving, or queuing a matching media selection at the associated content provider.

Payment options related to the matching media articles and matching media selections in the search result set may also be displayed at step 712. The payment options may be dependent on the subscription information obtained at step 1110 or the a la carte content providers obtained at step 1208. The payment options can include whether the matching media selection is free to the customer, is free to the customer because of their subscription service package with a content provider, or will cost a particular price or number of credits. In one embodiment, the price for the matching media selection may be discounted to the customer compared to the retail price. In another embodiment, the customer may also redeem a promotion code to gain access to the matching media selection. In a further embodiment, the payment option may include the opportunity to upgrade to a higher level service package which includes access to the matching media selection. The customer may pay for the matching media article and matching media selection using a credit card, redeeming credits or promotion codes, charging the price to their account at the content provider, or using other payment methods.

Figure 13:
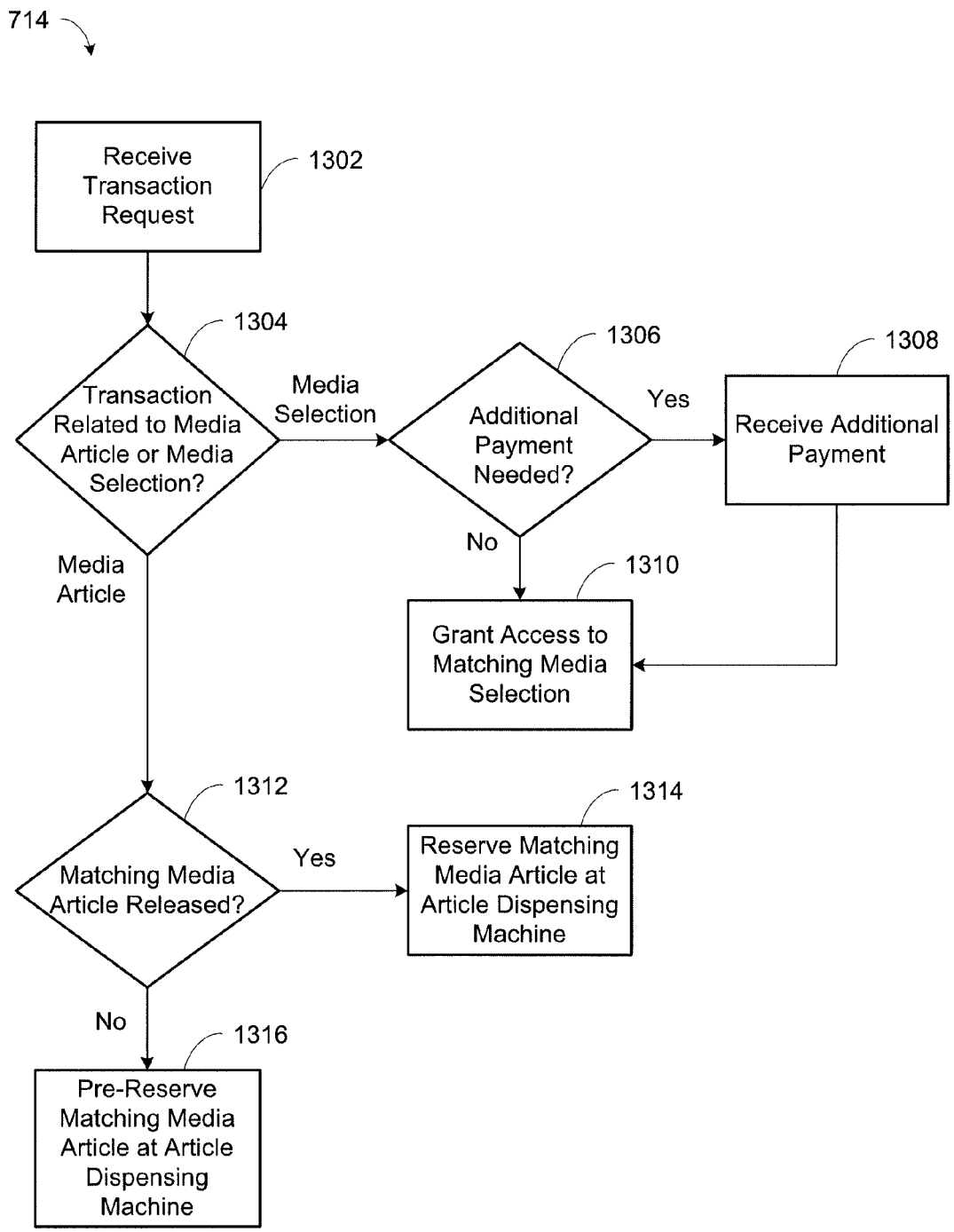
FIG. 13 is a flowchart illustrating operations for receiving a transaction request in the search operation of FIG. 7.

At step 714 and corresponding step 1302 of FIG. 13, a transaction request may be received by the central controller 302 following the provision of the search result set at step 712. As discussed above, the transaction request may be related to the matching media article or the matching media selection. At step 1304, it is determined whether the transaction in the transaction request is related to the matching media article or the matching media selection. If the transaction is related to the matching media article, then the process continues to step 1312. At step 1312, it is determined whether the matching media article has been released. Whether a media article has been released can be determined from information stored in the metadata database 410, the inventory database 412, or from other sources. Media articles that are "leaving soon" from an article dispensing machine 230 or from a content provider may be considered released since they are currently available to access. If the matching media article has been released, then the matching media article can be reserved for later pickup at an article dispensing machine 230 at step 1314. However, if the matching media article is determined to not have been released at step 1312, then the matching media article may be pre-reserved for pickup after it has been released, at step 1316. Media articles that are "coming soon" to an article dispensing machine 230 or content provider may be considered unreleased since they are not currently available to access.

Returning to step 1304, if the transaction request is related to the matching media selection, then the process continues to step 1306. At step 1306, it is determined whether additional payment is needed to access the matching media selection. This may occur, for example, when a user's particular subscription package does not currently include access to a matching media selection but where the user could access the matching media selection by upgrading to a premium subscription package. As another example, additional payment may be needed if the matching media selection is available from an a la carte content provider that requires payment for individual purchases. If additional payment is needed at step 1306, then the additional payment may be received at step 1308. The additional payment received at step 1308 may include, for example, a credit card charge, charging the payment to a customer account at the content provider, redeeming credits or promotion codes, or other payment methods. Access to the matching media selection can be granted at step 1310 following the receipt of the additional payment at step 1308. If additional payment is not needed at step 1306, access to the matching media selection can also be granted at step 1310.

Information regarding access to the matching media selection may be delivered to a user via email, SMS, mobile/consumer electronics device application alert or other communication. In one embodiment, an email, SMS, mobile/consumer electronics device application alert or other communication may be sent to the customer with a uniform resource locator (URL) link to view the matching media selection. In another embodiment, a QR code representing a URL link to view the matching media selection may be displayed to the customer. In another embodiment, an email, SMS, mobile/consumer electronics device application alert or other communication may be sent to the customer with details on how to view the matching media selection, such as instructions about how to access a video-on-demand title on an A/V display interface 309. In another embodiment, the matching media selection can be queued on the saved programs queue 604 on the A/V display interface 309 so that an application on the A/V display interface 309 can notify the customer of the availability of the matching media selection when the application is executed.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of searching for media content using a metadata database in communication with a processor, the metadata database comprising metadata identifying media content available at a plurality of article dispensing machines, the method comprising:
receiving a search request from a user operated device that includes a search criteria, the search criteria identifying one or more attributes for a requested media content, wherein the user operated device is not included in the plurality of article dispensing machines;
receiving device identifying information from the user operated device, the device identifying information comprising a MAC address or a digital certificate identifier of an audio/visual display interface;
determining a geographic location of the user operated device based, at least in part, on the device identifying information;
receiving a proximity limit that extends from the geographic location of the user operated device;
parsing the metadata database, and identifying a search set of article dispensing machines based on the parsing, wherein the search set of article dispensing machines includes a plurality of article dispensing machines within the proximity limit from the geographic location of the user operated device;
parsing the metadata database, and selecting selected media content satisfying at least one attribute from the search criteria based on the parsing;
generating a search result set comprising article dispensing machines from the search set of article dispensing machines identified as having available the selected media content;
when the search result set includes a plurality of the article dispensing machines:
ranking the plurality of article dispensing machines comprised in the search result set in order of distance from the geographic location of the user providing, to the user operated device; and
providing, to the user operated device, the search result set;
when the search result set does not include the plurality of the any article dispensing machines, providing, to the user operated device, matching media selections from one or more a la carte content providers identified as having available the selected media content.

2. The method of claim 1, wherein the device identifying information comprises one or more of an IP address of the user operated device, a MAC address of the audio/visual display interface, or a digital certificate identifier related to the user operated device.

3. The method of claim 1, further comprising modifying media content images displayed in a user interface of an application executing on the user operated device based on the geographic location of the user operated device.

4. The method of claim 1, wherein:
receiving the search request further comprises receiving predefined search criteria in response to a browsing request, the predefined search criteria for browsing of static or dynamic listings of the media content.

5. The method of claim 1, further comprising receiving a transaction request to access the selected media content.

6. The method of claim 5, wherein the transaction request comprises a reservation request to reserve for pickup the selected media content with at least one of the plurality of article dispensing machines comprised in the search result set.

7. The method of claim 5, wherein the transaction request comprises a pre-reservation request to pre-reserve the selected media content for pickup with at least one of the article dispensing machines comprised in the search result set when the selected media content is released.

8. The method of claim 5, further comprising receiving a payment for the selected media content, wherein the payment comprises at least one of a charge for the selected media content, a redemption of a promotion code, or a redemption of a credit code.

9. The method of claim 1, wherein the selected media content comprises at least one of a streaming media content, digital video disc, a Blu-Ray disc, or a video game disc.

10. The method of claim 1, wherein providing the search result set comprises ordering the selected media content based on one or more criteria comprising a price, a version, video quality, audio quality, a title, a release date, a running time, chapter information, technical details, a format, a peripheral device requirement, number of players, online capability, an actor, a voice actor, a director, a studio, a publisher, a developer, a platform, availability of downloadable content, episode information, a genre, a critic rating, an individualized rating, a parental rating, a description, related content, media artwork, a media still, or a proprietary identification code.

11. The method of claim 1, wherein determining the geographic location of the user operated device based, at least in part, on the device identifying information comprises:
parsing a device address database;
identifying the device identifying information from the parsed device address database, and
identifying the geographic location of the user operated device that corresponds to the device identifying information based on the identification of the device identifying information.

12. The method of claim 1, further comprising:
Providing, to the user operated device, recommendation information identifying popular media content previously rented within the proximity limit that extends from the geographic location of the user operated device, wherein the recommendation information is displayed on a user interface of an application executing on the user operated device.

13. The method of claim 1, wherein the search set of article dispensing machines only includes article dispensing machines within the proximity limit from the geographic location of the user operated device.

14. A system for searching for media content available at a plurality of article dispensing machines, the system comprising:
a plurality of article dispensing machines;
one or more databases, the one or more databases including a metadata database that comprises metadata of the media content, and an inventory database that comprises the availability of the media content at the plurality of article dispensing machines;
a memory configured to store processor executable instructions; and
a processor in communication with the memory, the one or more databases, and a user operated device, the processor configured to:
receive a search request from the user operated device including a search criteria comprising one or more attributes for a requested media content, wherein the user operated device is not included in the plurality of article dispensing machines;
receive device identifying information from the user operated device, the device identifying information comprising a MAC address or a digital certificate identifier of an audio/visual display interface;
determine a geographic location of the user operated device based, at least in part, on the device identifying information;
receive a proximity limit that extends from the geographic location of the user operated device;
parse the metadata database and identify a search set of article dispensing machines based on the parsing, wherein the search set of article dispensing machines includes a plurality of article dispensing machines within the proximity limit from the geographic location of the user operated device;
parse the metadata database, and select selected media content satisfying at least one attribute from the search criteria;
generate a search result set comprising article dispensing machines from the search set of article dispensing machines identified as having available the selected media content;
when the search result set includes a plurality of the article dispensing machines
rank the plurality of article dispensing machines comprising the search result set in order of distance from the geographic location of the user operated device; and
provide, to the user operated device, the search result set;
when the search result set does not include the plurality of the any article dispensing machines, providing, to the user operated device, matching media selections from one or more a la carte content providers identified as having available the selected media content.

15. The system of claim 14, wherein the device identifying information comprises one or more of an IP address of the audio/visual display interface, a MAC address of the audio/visual display interface, or a digital certificate identifier related to the user operated device.

16. The system of claim 14, wherein the processor is configured to modify media content images displayed in a user interface of an application executing on the user operated device based on the geographic location of the user operated device.

17. The system of claim 14, wherein:
the search request received from the user operated device further comprises a predefined search criteria that is received in response to a browsing request, the predefined search criteria for browsing of static or dynamic listings of the media content.

18. The system of claim 14, wherein the one or more databases further includes an address database, and wherein the geographic location of the user operated device is determined by accessing the address database.

19. The system of claim 14, wherein the processor is further configured to execute the processor executable instructions to receive a transaction request to access the selected media content.

20. The system of claim 19, wherein the transaction request comprises a reservation request to reserve for pickup the selected media content with at least one of the plurality of article dispensing machines comprised in the search result set.

21. The system of claim 19, wherein the transaction request comprises a pre-reservation request to pre-reserve the selected media content for pickup with at least one of the plurality of article dispensing machines comprised in the search result set when the selected media content is released.

22. The system of claim 19, wherein the processor is further configured to execute the processor executable memory to receive a payment for the selected media content, wherein the payment comprises at least one of a charge for the selected media content, a redemption of a promotion code, or a redemption of a credit code.

23. The system of claim 14, wherein the selected media content comprises at least one of a streaming media content, digital video disc, a Blu-Ray disc, or a video game disc.

24. The system of claim 14, wherein the processor is configured to execute the processor executable instructions to determine the geographic location of the user operated device based, at least in part, on the device identifying information to:

parse a device address database;
identify the device identifying information from the parsed device address database, and
identify the geographic location of the user operated device that corresponds to the device identifying information based on the identification of the device identifying information.

25. The system of claim 14, wherein the processor is configured to: provide, to the user operated device, recommendation information identifying popular media content previously rented within the proximity limit that extends from the geographic location of the user operated device, wherein the recommendation information is displayed on a user interface of an application executing on the user operated device.

26. The system of claim 14, wherein the search set of article dispensing machines only includes article dispensing machines within the proximity limit from the geographic location of the user operated device.

27. The system of claim 14, wherein the search set of article dispensing machines only includes article dispensing machines within the proximity limit from the geographic location of the user operated device.

* * * * *